(12) United States Patent
Rahman et al.

(10) Patent No.: US 10,958,326 B2
(45) Date of Patent: Mar. 23, 2021

(54) METHOD AND APPARATUS FOR RESOURCE-BASED CSI ACQUISITION IN ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US); Li Guo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/269,496

(22) Filed: Feb. 6, 2019

(65) Prior Publication Data

US 2019/0260448 A1    Aug. 22, 2019

Related U.S. Application Data

(60) Provisional application No. 62/738,188, filed on Sep. 28, 2018, provisional application No. 62/713,261, (Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0486* (2013.01); *H04B 7/0632* (2013.01);
(Continued)

(58) Field of Classification Search
CPC .. H04B 7/0626; H04B 7/0486; H04B 7/0632; H04B 7/0639; H04B 7/0452;
(Continued)

(56) References Cited

U.S. PATENT DOCUMENTS

2014/0086187 A1    3/2014  Kang et al.
2015/0257073 A1    9/2015  Park et al.
(Continued)

FOREIGN PATENT DOCUMENTS

WO    2017206169 A1    12/2017

OTHER PUBLICATIONS

"3rd Generation Partnership Project;Technical Specification Group Radio Access Network; NR;Multiplexing and channel coding (Release 15)", 3GPP TS 38.212 V15.4.0, Dec. 2018, 97 pages.
(Continued)

*Primary Examiner* — Obaidul Huq

(57) ABSTRACT

A method of a user equipment (UE) in a wireless communication system is provided. The method comprises receiving, from at least one transmission and reception point (TRP) of a group of (N) TRPs, channel status information (CSI) configuration information, determining a CSI report based on the CSI configuration information, identifying, based on the configuration information, one or more TRPs of the group of (N) TRPs to transmit the determined CSI report, and transmitting, to the one or more TRPs, the determined CSI report over an uplink channel. The determined CSI report includes a TRP indicator for selecting (M) TRPs of the group of (N) TRPs, and CSI for each of the selected (M) TRPs, wherein N is greater than one, and wherein M is greater or equal to 1, and less or equal to N.

20 Claims, 11 Drawing Sheets

Related U.S. Application Data filed on Aug. 1, 2018, provisional application No. 62/710,427, filed on Feb. 16, 2018.

(51) Int. Cl.
| | |
|---|---|
| *H04W 72/04* | (2009.01) |
| *H04L 25/02* | (2006.01) |
| *H04B 7/0456* | (2017.01) |
| *H04B 7/0452* | (2017.01) |

(52) U.S. Cl.
CPC ......... *H04B 7/0639* (2013.01); *H04L 5/0048* (2013.01); *H04L 25/0226* (2013.01); *H04W 72/0413* (2013.01); *H04W 72/0446* (2013.01); *H04B 7/0452* (2013.01)

(58) Field of Classification Search
CPC ............ H04L 5/0048; H04L 25/0226; H04W 72/0413; H04W 72/0446
USPC ....................................... 370/310, 328, 329
See application file for complete search history.

(56) References Cited

U.S. PATENT DOCUMENTS

| | | | | |
|---|---|---|---|---|
| 2018/0279287 | A1* | 9/2018 | Wilson | H04W 16/28 |
| 2019/0342768 | A1* | 11/2019 | Xu | H04B 7/0408 |
| 2020/0177254 | A1* | 6/2020 | Lee | H04B 7/0639 |

OTHER PUBLICATIONS

"3rd Generation Partnership Project;Technical Specification Group Radio Access Network; NR;Physical layer procedures for data (Release 15)", 3GPP TS 38.214 V15.4.0, Dec. 2018, 102 pages.
"3rd Generation Partnership Project; Technical Specification Group Radio Access Network; Evolved Universal Terrestrial Radio Access (E-UTRA); Physical channels and modulation (Release 14)", 3GPP TS 36.211 V14.4.0, Sep. 2017, 197 pages.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.4.0, Sep. 2017, 198 pages.
"3rd Generation Partnership Project; Technical Specification Group Radio Access Network; Evolved Universal Terrestrial Radio Access (E-UTRA); Physical layer procedures (Release 14)", 3GPP TS 36.213 V14.4.0, Sep. 2017, 462 pages.
"3rd Generation Partnership Project;Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, 108 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 753 pages.
"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.
ISA/KR, International Search Report and Written Opinion of the International Searching Authority in connection with International Application No. PCT/KR2019/001922, dated May 24, 2019, 8 pages.
Ericsson, "CSI feedback for multi-TRP," R1-1718737, 3GPP TSG RAN WG1 Meeting 90bis, Prague, Czech Republic, Oct. 9-13, 2017, 8 pages.
Interdigital, Inc., "Remaining issues on beam management," R1-1718482, 3GPP TSG RAN WG1 Meeting #90bis, Prague, Czech Republic, Oct. 9-13, 2017, 11 pages.
Samsung, "Discussion on Tx beam grouping configuration for multi-panel TRP and multi-TRP," R1-1717610, 3GPP TSG RAN WG1 Meeting #90bis, Prague, Czech Republic, Oct. 9-13, 2017, 6 pages.
Extended European Search Report dated Sep. 30, 2020 regarding Application No. 19754465.3, 8 pages.
Samsung, "Beam management for multi-TRP operation", 3GPP TSG RAN WG1#88, R1-1702935, Feb. 2017, 4 pages.

* cited by examiner

METHOD AND APPARATUS FOR RESOURCE-BASED CSI ACQUISITION IN ADVANCED WIRELESS COMMUNICATION SYSTEMS

CROSS-REFERENCE TO RELATED APPLICATION(S) AND CLAIM OF PRIORITY

The present application claims priority to U.S. Provisional Patent Application Ser. No. 62/710,427, filed on Feb. 16, 2018, U.S. Provisional Patent Application Ser. No. 62/713,261, filed on Aug. 1, 2018, and U.S. Provisional Patent Application Ser. No. 62/738,188, filed on Sep. 28, 2018. The content of the above-identified patent documents is incorporated herein by reference.

TECHNICAL FIELD

The present disclosure relates generally to channel state acquisition particularly, relates to resource-based CSI acquisition in an advanced wireless communication system.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE.

SUMMARY

Embodiments of the present disclosure provide methods and apparatuses for wideband CSI reporting in an advanced wireless communication system.

In one embodiment, a UE in a wireless communication system is provided. The UE comprises a transceiver configured to receive, from at least one transmission and reception point (TRP) of a group of (N) TRPs, channel status information (CSI) configuration information. The UE further comprises a processor operably connected to the transceiver, the processor configured to determine a CSI report based on the CSI configuration information, and identify, based on the configuration information, one or more TRPs of the group of (N) TRPs to transmit the determined CSI report. The transceiver is further configured to transmit, to the one or more TRPs, the determined CSI report over an uplink channel. The determined CSI report includes a TRP indicator for selecting (M) TRPs of the group of (N) TRPs, and CSI for each of the selected (M) TRPs. N is greater than one. M is greater or equal to 1, and less or equal to N.

In another embodiment, a TRP in a wireless communication system is provided. The TRP comprises a transceiver configured to transmit, to a UE, CSI configuration information, wherein the TRP is at least one TRP of a group of (N) TRPs, and receive, from the UE, a CSI report over an uplink channel. The CSI report is determined based on the CSI configuration information. The determined CSI report includes a TRP indicator for selecting (M) TRPs of the group of (N) TRPs, and CSI for each of the selected (M) TRPs. N is greater than one. M is greater or equal to 1, and less or equal to N.

In yet another embodiment, a method of a UE in a wireless communication system is provided. The method comprises receiving, from at least one TRP of a group of (N) TRPs, CSI configuration information, determining a CSI report based on the CSI configuration information, identifying, based on the configuration information, one or more TRPs of the group of (N) TRPs to transmit the determined CSI report, and transmitting, to the one or more TRPs, the determined CSI report over an uplink channel. The determined CSI report includes a TRP indicator for selecting (M) TRPs of the group of (N) TRPs, and CSI for each of the selected (M) TRPs, wherein N is greater than one, and wherein M is greater or equal to 1, and less or equal to N.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
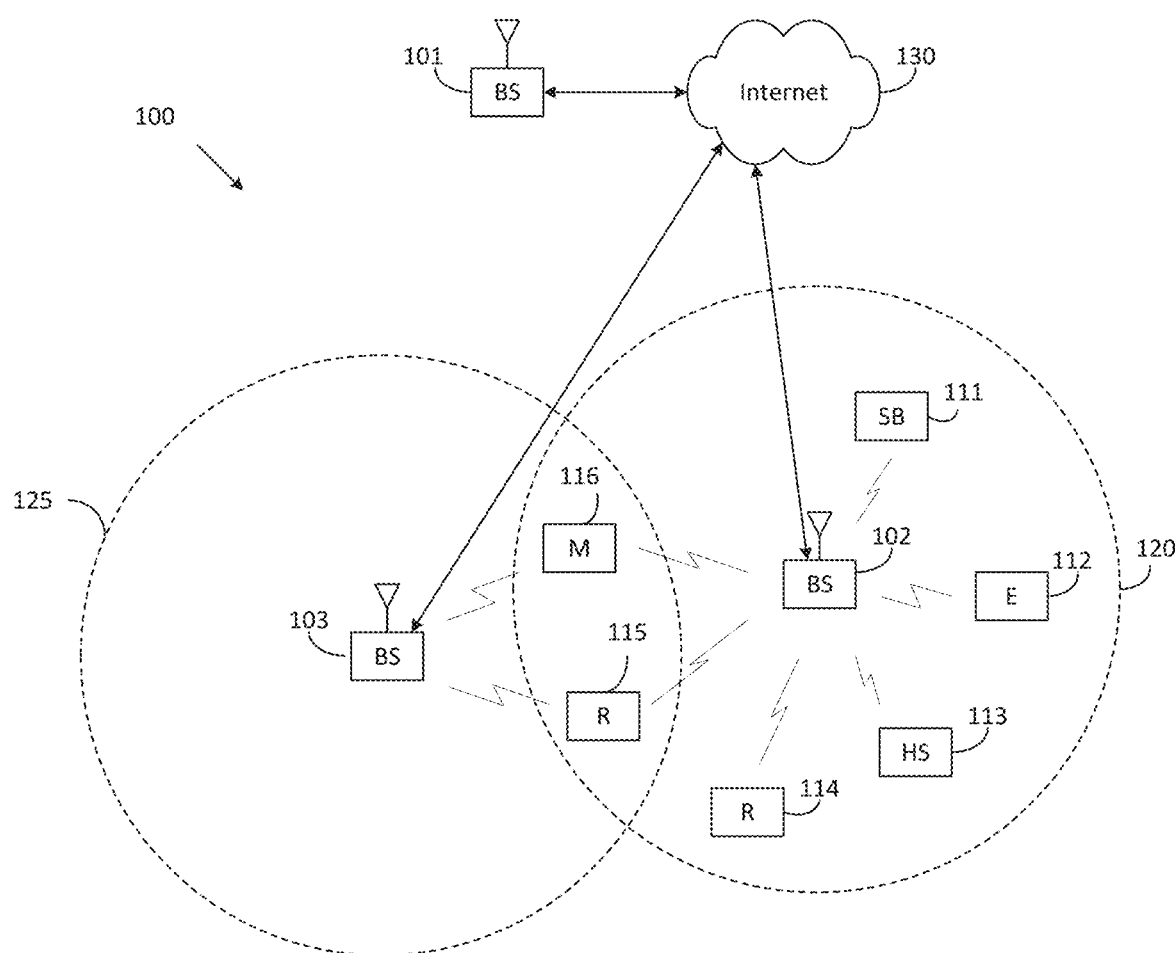
FIG. 1 illustrates an example wireless network according to embodiments of the present disclosure.

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.4.0, "E-UTRA, Physical channels and modulation;" 3GPP TS 36.212 v14.4.0, "E-UTRA, Multiplexing and Channel coding;" 3GPP TS 36.213 v14.4.0, "E-UTRA, Physical Layer Procedures;" 3GPP TS 36.321 v14.4.0, "E-UTRA, Medium Access Control (MAC) protocol specification;" 3GPP TS 36.331 v14.4.0, "E-UTRA, Radio Resource Control (RRC) protocol specification;" 3GPP TR 22.891 v1.2.0; 3GPP TS 38.212 v15.4.0, "E-UTRA, NR, Multiplexing and Channel coding;" and 3GPP TS 38.214 v15.4.0, "E-UTRA, NR, Physical layer procedures for data."

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
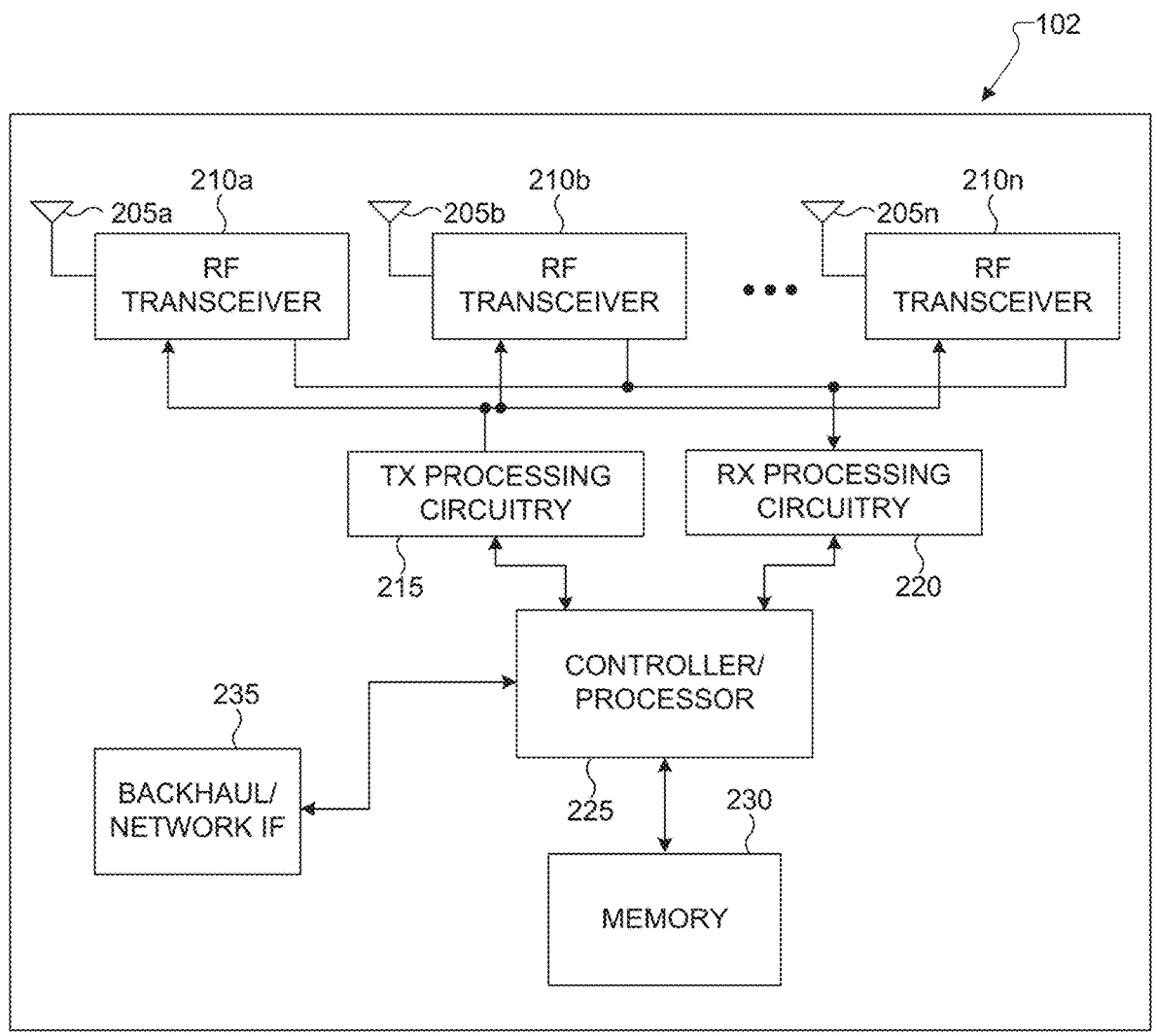
FIG. 2 illustrates an example eNB according to embodiments of the present disclosure.
Figure 3:
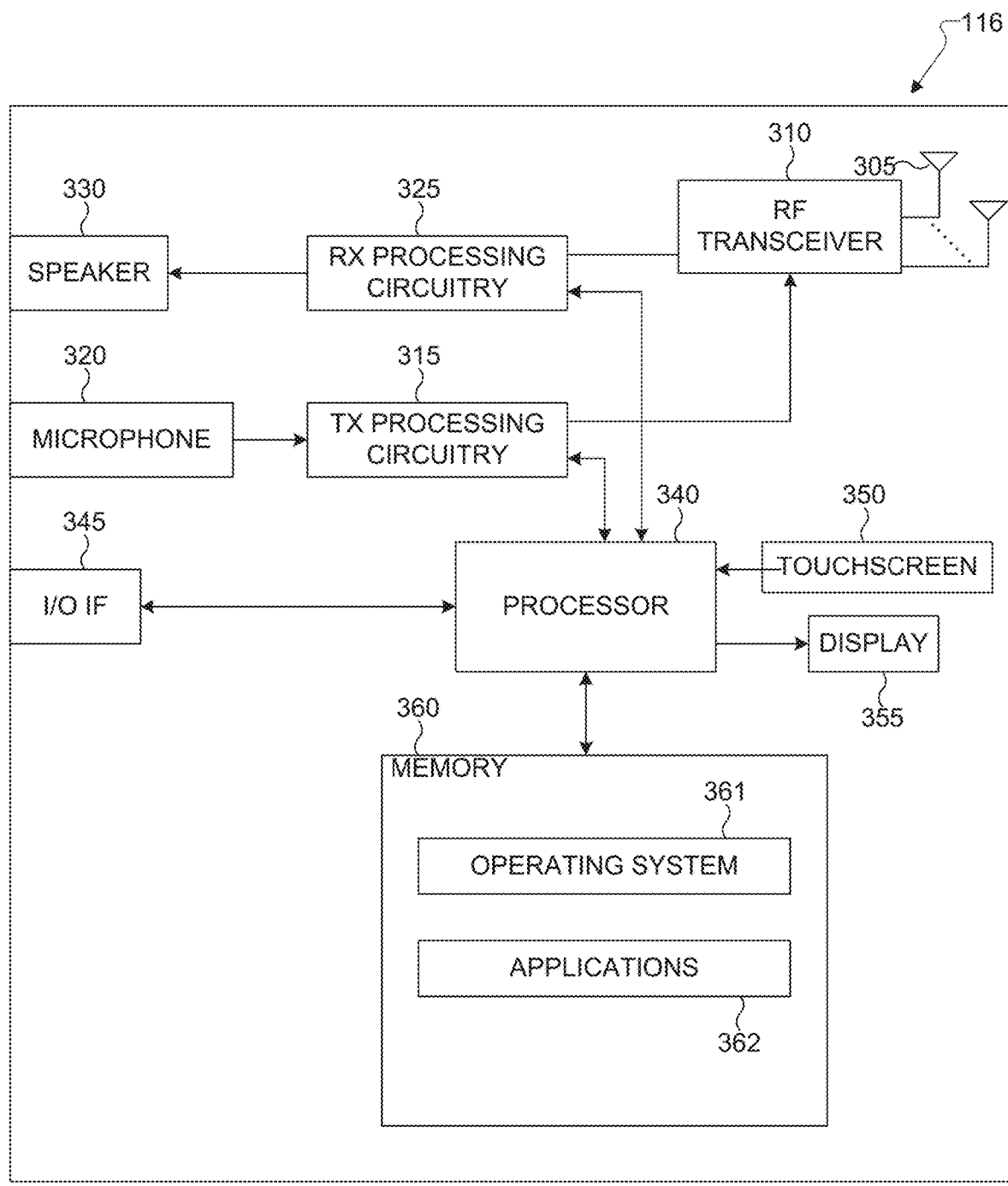
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient resource-based CSI acquisition in an advanced wireless communication system. In certain embodiments, and one or more of the eNBs 101-103 includes circuitry, programming, or a combination thereof, for resource-based CSI acquisition in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
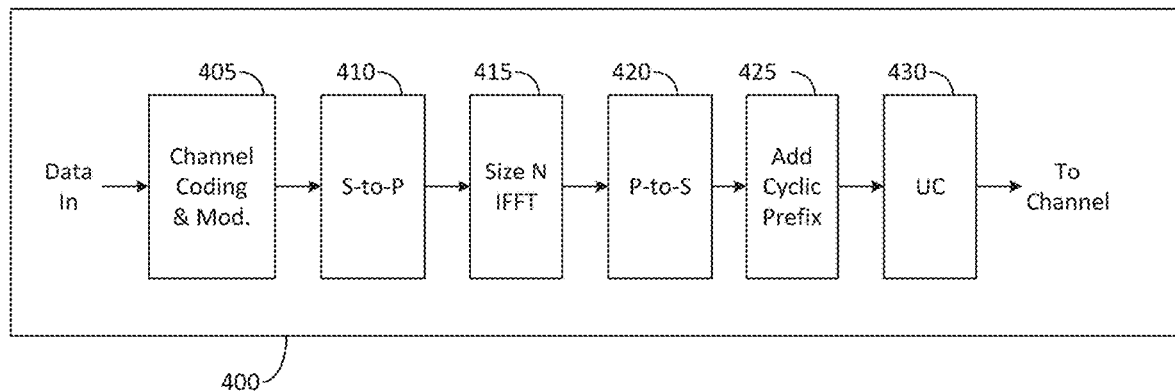
FIG. 4A illustrates a high-level diagram of an orthogonal frequency division multiple access transmit path according to embodiments of the present disclosure.
Figure 4B:
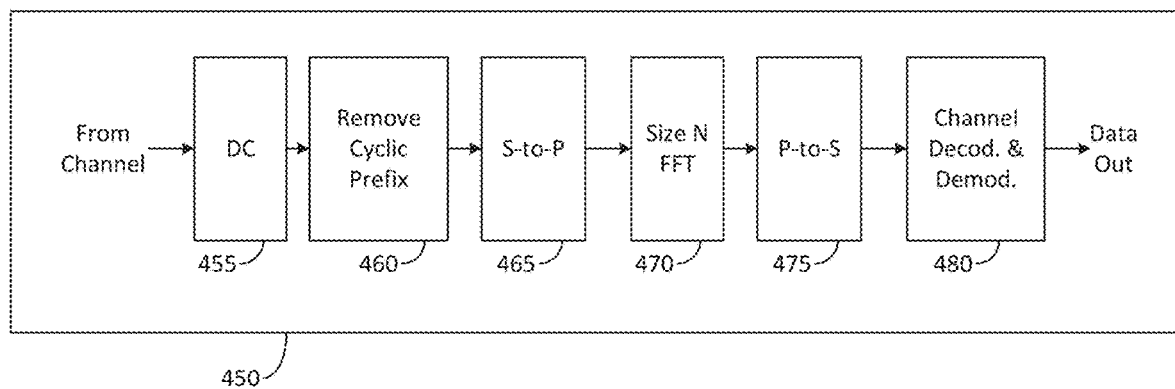
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{DSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
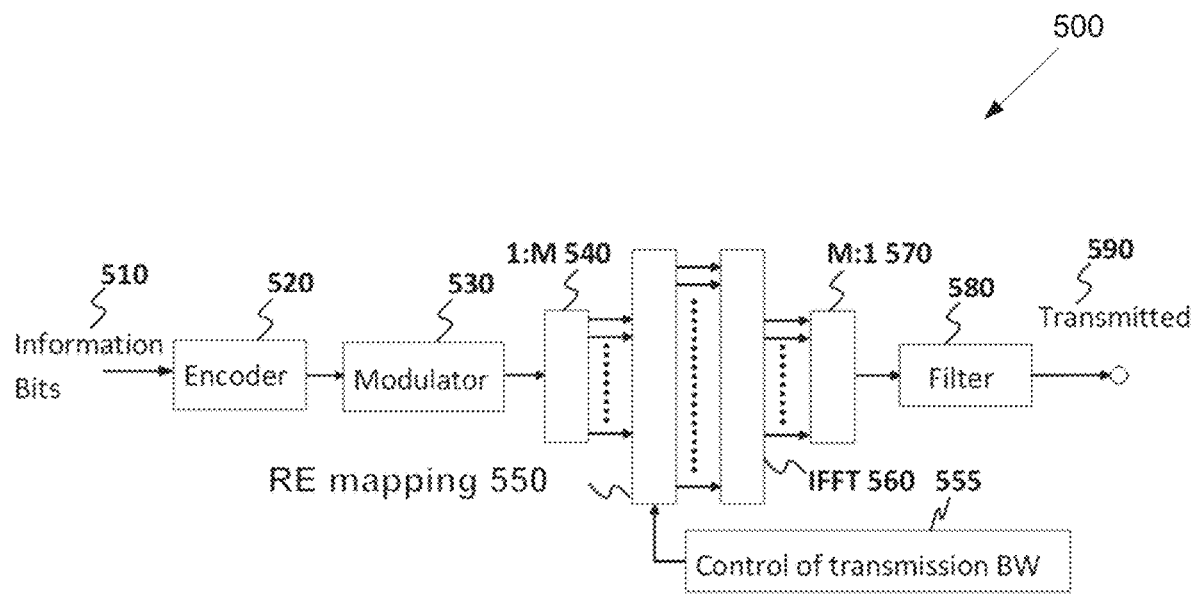
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
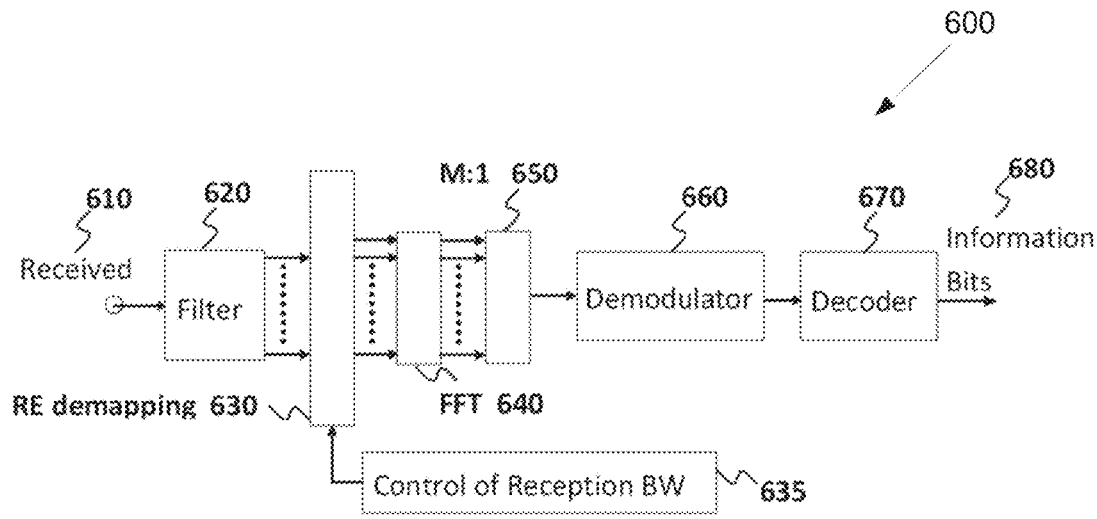
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
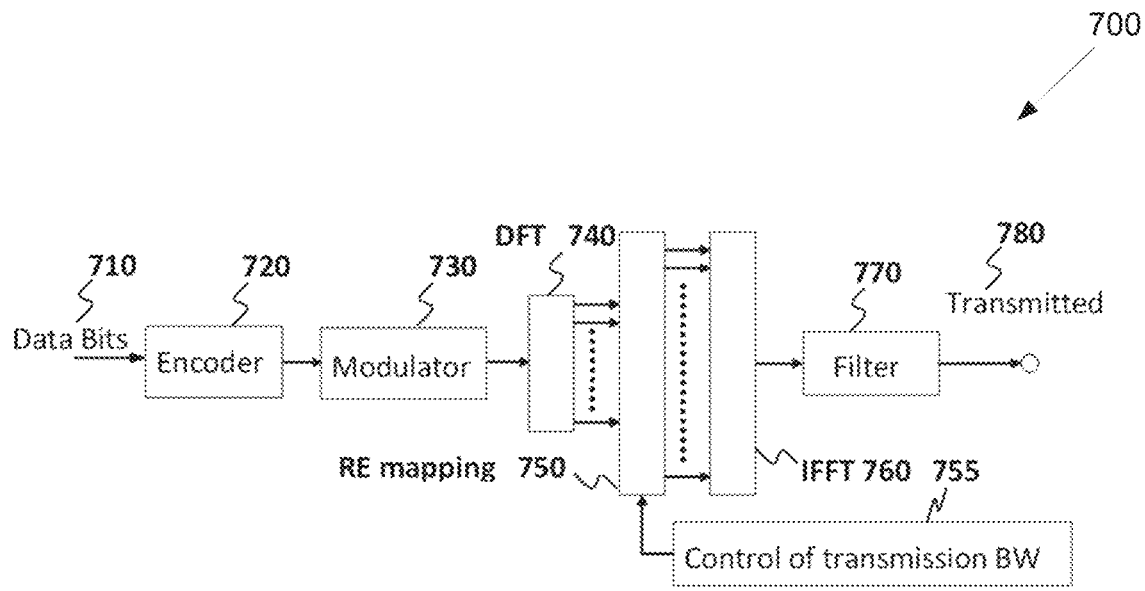
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
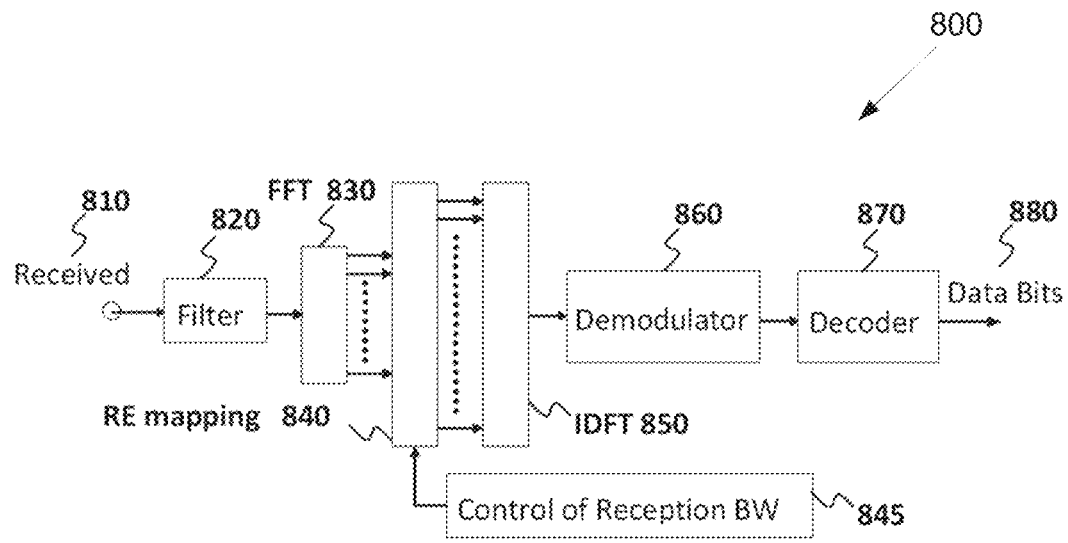
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
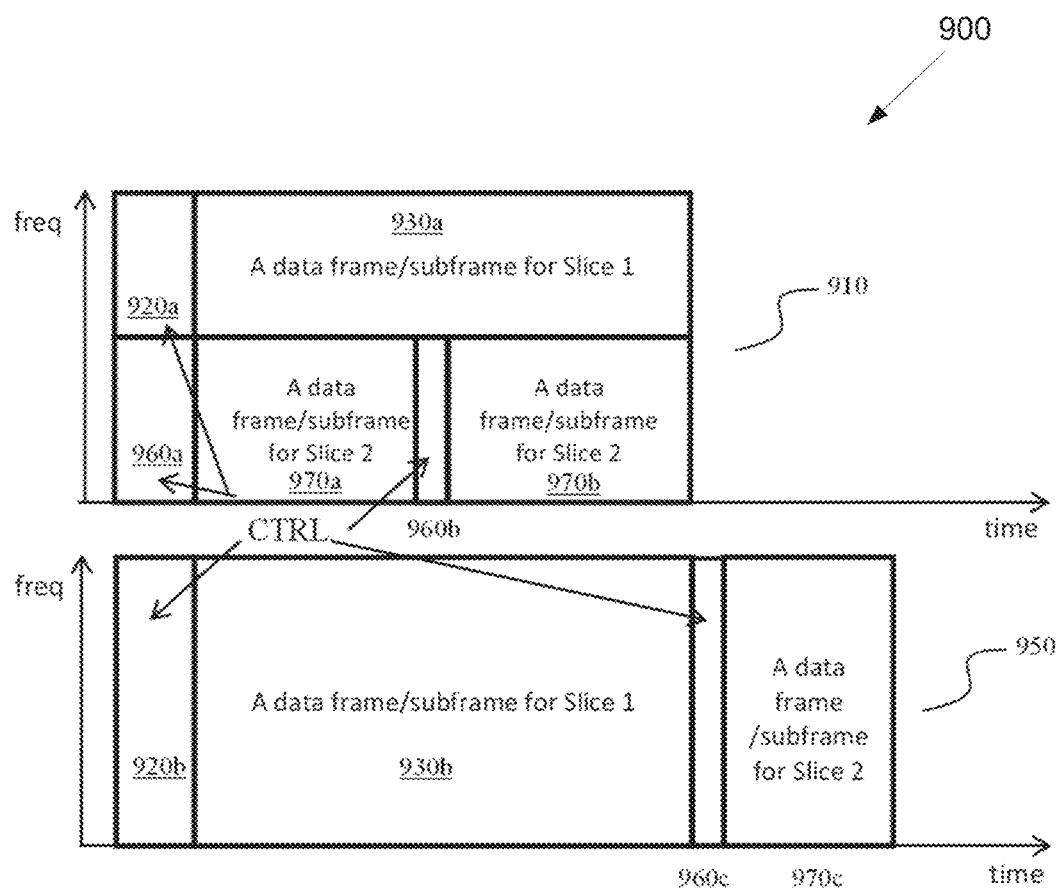
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

3GPP specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
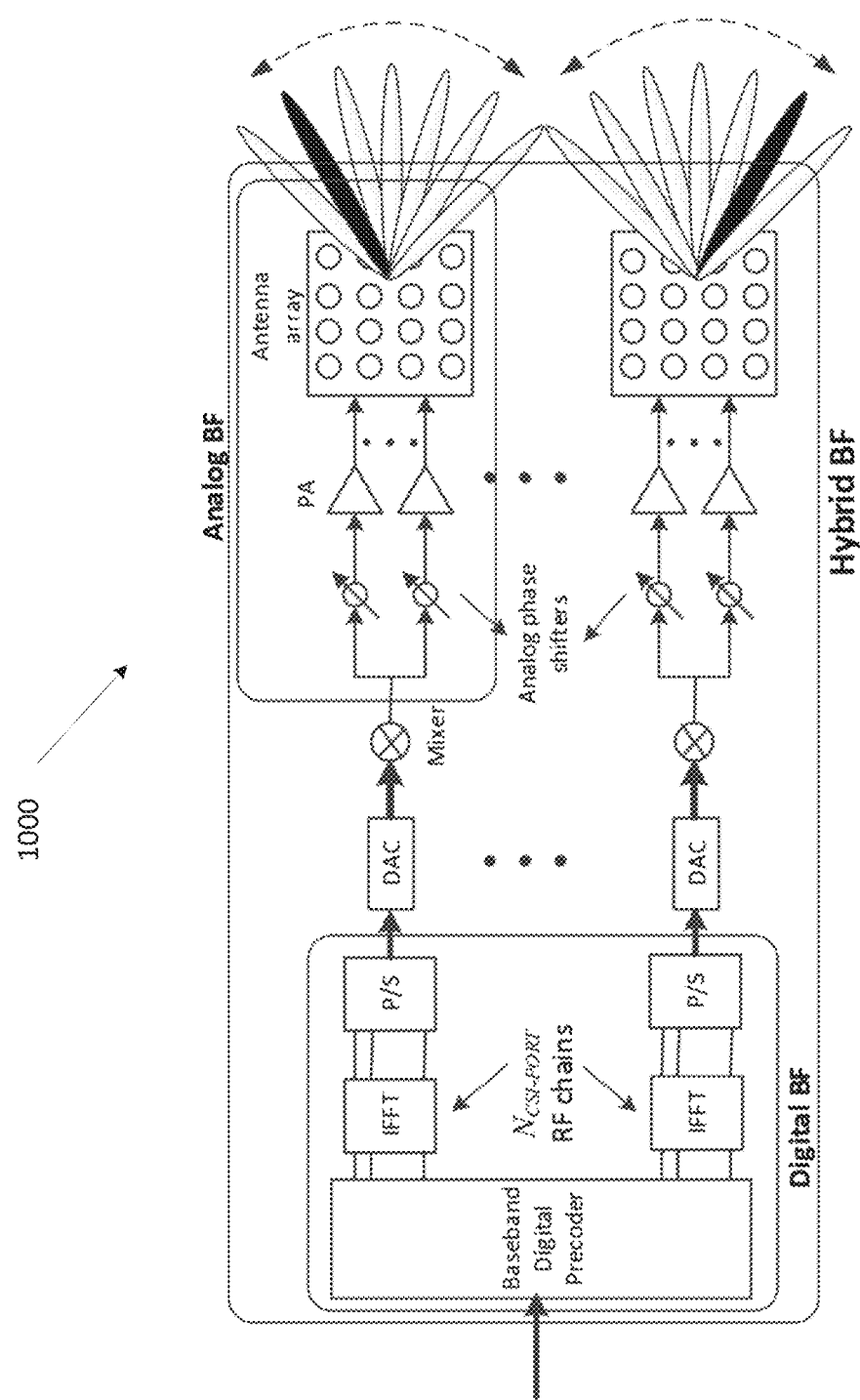
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Figure 11:
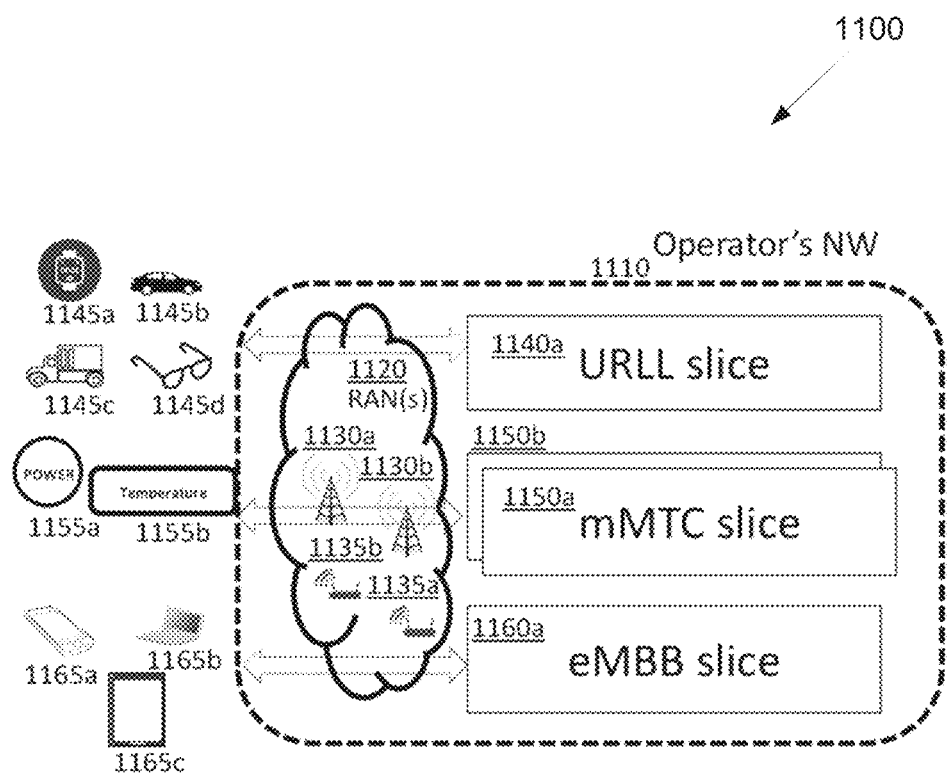
FIG. 11 illustrates an example network configuration according to embodiments of the present disclosure.

FIG. 11 illustrates an example network configuration 1100 according to embodiments of the present disclosure. The embodiment of the network configuration 1100 illustrated in FIG. 11 is for illustration only. FIG. 11 does not limit the scope of this disclosure to any particular implementation of the configuration 1100.

In order for the 5G network to support such diverse services with different quality of services (QoS), one scheme has been identified in 3GPP specification, called network slicing.

As shown in FIG. 11, An operator's network 1110 includes a number of radio access network(s) 1120 (RAN(s)) that are associated with network devices such as eNBs 1130a and 1130b, small cell base stations (femto/pico eNBs or Wi-Fi access points) 1135a and 1135b. The network 1110 can support various services, each represented as a slice.

In the example, an URLL slice 1140a serves UEs requiring URLL services such as cars 1145b, trucks 1145c, smart watches 1145a, and smart glasses 1145d. Two mMTC slices 1150a and 550b serve UEs requiring mMTC services such as power meters 555b, and temperature control box 1155b. One eMBB slice 1160a serves UEs requiring eMBB services such as cells phones 1165a, laptops 1165b, and tablets 1165c. A device configured with two slices can also be envisioned.

From 3GPP specification, MIMO has been identified as an essential feature in order to achieve high system throughput requirements and MIMO may continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity.

For FDD systems, on the other hand, it can be acquired using the CSI-RS transmission from eNB, and CSI acquisition and feedback from UE. In FDD systems, the CSI feedback framework is "implicit" in the form of CQI/PMI/RI derived from a codebook assuming SU transmission from eNB.

For 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. In general, the Type I or Type II CSI reported using a PMI codebook, where the PMI has two components, the first PMI i1 and the second PMI i2. If the subband CSI reporting is configured, then the UE reports a single wideband first PMI i1 which indicates a group of beams/pre-coders, and one second PMI i2 for each subband which indicates a precoder belonging to the group of precoders indicated by the reported first PMI i1. The subband CSI reporting is generally configured for use cases such as MU-MIMO transmission since the precoding is known to be frequency-selective (i.e., varies from one subband to another subband). The system performance depends on the PMI codebook. For example, the PMI codebook for Type I CSI reporting performs worse than that for Type II CSI reporting, but the performance is proportional to the size of the PMI codebook which determines the CSI reporting payload (number of feedback bits). In fact, the Type I CSI reporting payload is much smaller than the Type II CSI reporting payload. So, the system performance gain is directly proportional to the PMI codebook and hence to the CSI reporting payload.

The above-mentioned dependence on the PMI codebook can be replaced or weakened if the gNB or network has some rough a priori information about the subspace of the DL channel (e.g. a subset of the PMI codebook). For example, the gNB can beamform multiple CSI-RS resources, each with 1 port, using a few candidate beamforming vectors, and the UE can report (select) one of these resources in each subband (e.g. via CRI) in order to report subband CSI. With this approach, the gNB has the flexibility to choose any candidate beamforming vectors, i.e., the reliance on PMI codebook to report subband CSI is not needed. Note also that this approach is also applicable to UL MIMO wherein the UE beamforms multiple SRS resources, each with 1 port, using a few candidate beamforming vectors, and the gNB can report (indicate) one of these resources in each subband (e.g. via SRI) in order to report subband CSI for UL. This disclosure proposes the details of such CSI reporting methods.

Throughout the present disclosure, a CSI-RS resource refers to a non-zero power (NZP) CSI-RS resource, unless stated otherwise.

The higher layer parameter ReportFreqConfiguration indicates the frequency granularity of a CSI Report. A CSI reporting setting configuration defines a CSI reporting band as a subset of subbands of the bandwidth part, where the ReportFreqConfiguration indicates single CQI or multiple CQI reporting, as configured by the higher layer parameter CQI-FormatIndicator.

When single CQI reporting is configured, a single CQI is reported for each codeword for the entire CSI reporting band. When multiple CQI reporting is configured, one CQI for each codeword is reported for each subband in the CSI reporting band.

In one embodiment 1, when the UE is configured with the higher layer parameter ReportQuantity set to "CRI/CQI," then the UE may report a single or multiple "CRI/CQI" according to at least one of the following alternatives.

In one embodiment of Alt 1-1, if the higher layer parameter CQI-FormatIndicator indicates a single CQI reporting, then a single CRI and a single CQI are reported for each codeword for the entire CSI reporting band.

In one embodiment of Alt 1-2, if the higher layer parameter CQI-FormatIndicator indicates multiple CQI reporting, then one CQI for each codeword is reported for each subband in the CSI reporting band. In addition, a single CRI is reported for each codeword for the entire CSI reporting band.

In one embodiment of Alt 1-3, if the higher layer parameter CQI-FormatIndicator indicates multiple CQI reporting, then one CQI for each codeword is reported for each subband in the CSI reporting band. In addition, one CRI for each codeword is reported for each subband in the CSI reporting band.

In one embodiment of Alt 1-4, if the higher layer parameter CQI-FormatIndicator indicates a single CQI reporting and the higher layer parameter CRI-FormatIndicator indicates a single CRI reporting, then a single CRI and a single CQI are reported for each codeword for the entire CSI reporting band.

In one embodiment of Alt 1-5, if the higher layer parameter CQI-FormatIndicator indicates a single CQI reporting and the higher layer parameter CRI-FormatIndicator indicates multiple CRI reporting, then a single CQI is reported for each codeword for the entire CSI reporting band and one CRI for each codeword is reported for each subband in the CSI reporting band.

In one embodiment of Alt 1-6, if the higher layer parameter CQI-FormatIndicator indicates multiple CQI reporting and the higher layer parameter CRI-FormatIndicator indicates a single CRI reporting, then one CQI for each codeword is reported for each subband in the CSI reporting band and a single CRI is reported for each codeword for the entire CSI reporting band.

In one embodiment of Alt 1-7, if the higher layer parameter CQI-FormatIndicator indicates multiple CQI reporting and the higher layer parameter CRI-FormatIndicator indicates multiple CRI reporting, then one CQI for each codeword is reported for each subband in the CSI reporting band and one CRI for each codeword is reported for each subband in the CSI reporting band.

Note that at least one of these alternatives (e.g., the aforementioned embodiments of Alt 1-1 to Alt 1-7) is configured via higher layer signaling (RRC). For example, the signaling can be via the parameter CQI-FormatIndicator or the parameter pair (CQI-FormatIndicator, CRI-FormatIndicator).

In a variation, the frequency granularity to report multiple CRIs in the aforementioned Alt 1-1 through Alt 1-7 is according to at least one of the following alternatives: Alt 1-8: the frequency granularity is equal to the subband size; Alt 1-9: the frequency granularity is smaller than the subband size, for example, equal to an RB; Alt 1-10: the frequency granularity is larger than the subband size, for example, a multiple of subband size; and Alt 1-11: the frequency granularity is a fixed fraction (1/r) of the entire CSI reporting band, for example, ½ or ¼ or ⅛. One of these alternatives is either fixed (e.g. Alt 1-8) or configured (e.g. via higher layer RRC signaling) or reported by the UE.

In another variation, the frequency granularity to report multiple CQIs in the aforementioned embodiments of Alt 1-1 through Alt 1-7 is according to at least one of the following alternatives: Alt 1-12: the frequency granularity is equal to the subband size; and Alt 1-13: the frequency granularity is equal to that to report CRI. One of these alternatives is either fixed (e.g. the aforementioned embodiment of Alt 1-12) or configured (e.g. via higher layer RRC signaling) or reported by the UE.

In another variation, the parameter CRI-FormatIndicator is replaced with the parameter PMI-FormatIndicator in the above alternatives.

In one embodiment 1A, the reported CRI (or CRIs) indicates a CSI-RS resource (or indicate CRI-RS resources) associated with a small number of CSI-RS ports (e.g. 1 or 2). The UE is configured with $N_{CSI-RS} \geq 1$ CSI-RS resources via higher layer signaling. Note that when $N_{CSI-RS}=1$, then CRI does not need to be reported. In one method, $N_{CSI-RS} \geq 1$ when ReportQuantity is set to "CRI/CQI." In another method, $N_{CSI-RS} \geq 1$ when ReportQuantity is set to "CRI/CQI." One of the two methods may be supported in the specification.

In one embodiment 1B, the reported CQI (or CQIs) corresponds to a rank value that is equal to the number of ports associated with the CSI-RS resource indicated by the reported CRI (or correspond to rank values each of which is equal to the number of ports associated with the CSI-RS resource indicated by the corresponding reported CRI).

In one embodiment 1C, the number of ports associated with each of the $N_{CSI-RS}$ CSI-RS resources is according to at least one of the following alternatives. In one embodiment of Alt 1C-1, the number of ports is the same for all $N_{CSI-RS}$ resources. Therefore, the reported CQI (or CQIs) corresponds to a fixed rank that does not change across SBs, i.e., rank assumption for CQI reporting is WB. In one embodiment of Alt 1C-2, the number of ports can be different from one resource to another. Therefore, if multiple CQI and multiple CRI are reported, then the rank assumption for CQI reporting can change from SB to another. For example, CQI in one SB can correspond to rank 1 (if the corresponding reported CRI indicates a 1-port resource) and CQI and another SB can correspond to rank 2 (if the corresponding reported CRI indicates a 2-port resource).

One use case of multiple CRI/CQI reporting is the case in which the precoding or beamforming of data is in at least one of two domains: (1) radio frequency (RF) or analog domain and (2) digital or baseband domain. The $N_{CSI-RS}$ CSI-RS resources can be beamformed using $N_{CSI-RS}$ beamforming vectors. These beamforming vectors can be obtained by the gNB by measuring SRS transmitted by the UE (relying on UL-DL reciprocity). An example of such a system is high frequency (such as millimeter wave) system.

Another use case is hybrid CSI in which the UE is configured to report the following two CSI reports. The first CSI report includes a long term and WB CSI indicating the information about a subspace or a set of candidate beamforming vectors. An example of subspace reporting is $i_1$ only reporting which indicates a set of DFT beams. The second CSI includes the CRI/CQI as provided in this disclosure (embodiment 1 or 2 or later embodiments). The CSI-RS resources for this second CSI reporting are beamformed or precoded using the subspace or the set of candidate beamforming vectors reported in the first CSI report.

Another user case is URLL applications in which CSI computation time can be reduced significantly if only CRI/CQI needs to be reported since there is no need to perform codebook search for the PMI. So, the CSI can be computed and reported much faster than the case (e.g. eMBB applications) in which the UE needs to preform codebook search in order to obtain the PMI for CSI reporting.

A few advantages/benefits of multiple CRI/CQI reporting (using beamformed CSI-RS) over CRI/PMI/CQI reporting (using non-precoded or non-beamformed CSI-RS and PMI codebook) are as follows.

In one embodiment, the first advantage is in terms of performance gain wherein multiple CRI/CQI reporting is expected to show performance gain over CRI/PMI/CQI reporting. This is because of the fact that beamformed CSI-RS can achieve more SINR at the UE when compared with non-precoded CSI-RS.

The second advantage is that any beamforming or precoding vector can be used to beamform the CSI-RS resources. In particular, reliance on a codebook such as PMI codebook to beamform these resources is not necessary.

The third advantage is that multiple CRI/CQI can reduce feedback overhead (bits) when compared with CRI/PMI/CQI reporting.

The fourth advantage is that the reliability can be improved (e.g. in terms of lower BLER) and the PDSCH data transmission can be more robust (against interference, blockage etc.), which are required for URLL applications.

In one embodiment 2, when the UE is configured with the higher layer parameter ReportQuantity set to "CRI/CQI" or "CRI/CQI/RI," then the UE may report a single or multiple "CRI/CQI" according to at least one of the alternatives in embodiment 1 (e.g., the aforementioned embodiments of Alt 1-1 through Alt 1-7). In addition, the UE may report RI according to at least one of the following alternatives.

In one embodiment of Alt 2-1, RI is reported explicitly as a separate CSI component. In this alternative, the UE can be configured with ReportQuantity set to "CRI/CQI/RI." A few examples are as follows.

In one example 2-1, assuming each CSI-RS resource has only 1 port (i.e., corresponds to a single transmission layer), if RI=1 is reported, then one CRI is reported, and if RI=2 is reported, then two CRIs are reported, and so on. The reported CQI corresponds to the reported RI value and the aggregated reported CRI(s).

In one example 2-2, assuming each CSI-RS resource has only 2 ports (i.e., corresponds to two transmission layers and only even values of RI can be reported), if RI=2 is reported, then one CRI is reported, and if RI=4 is reported, then two CRIs are reported, and so on. The reported CQI corresponds to the reported RI value and the aggregated reported CRI(s).

In one example 2-3, assuming each CSI-RS resource has only 1 or 2 ports (i.e., corresponds to one of two transmission layers), if RI=1 is reported, then one CRI (associated with a 1 port resource) is reported, and if RI=2 is reported, then either one CRI (associated with a 2 port resource) is reported or two CRIs (each associated with a 1 port resource) are reported, and so on. The reported CQI corresponds to the reported RI value and the aggregated reported CRI(s).

In one embodiment Alt 2-2, RI is reported implicitly (jointly) either with CRI or CQI. In this alternative, ReportQuantity can be set to "CRI/CQI."

In one embodiment Alt 2-3, RI is not reported. In this alternative, ReportQuantity can be set to "CRI/CQI."

Either one of the aforementioned embodiments of Alt 2-1, 2-2, and 2-3 is fixed in the specification (e.g., as a system parameter) or one of them is configured via higher layer (RRC) signaling. In this embodiment, RI can be reported in a WB manner or in a per SB manner. The rest of the details of embodiment 1 are applicable to this embodiment also.

When the UE is configured to report CSI for each of multiple ($N_g$) gNBs/TRPs (e.g. for non-coherent joint transmission from multiple gNBs/TRPs) and if the UE is further configured with a CSI-ReportConfig with the higher layer parameter reportQuantity set to "cri-RI-CQI", where the configuration is either joint for all TRPs or independent for each TRP, then the UE may report CRI/RI/CQI for each gNB/TRP according to at least one of the following alternatives.

In one example of the embodiment Alt 2A-1, the UE is configured with higher layer parameter non-PMI-PortIndication contained in a CSI-ReportConfig, where r ports are indicated in the order of layer ordering for rank r and each CSI-RS resource in the CSI resource setting is linked to the CSI-ReportConfig based on the order of the associated NZP-CSI-RS-ResourceId in the linked CSI resource setting for channel measurement given by higher layer parameter resourcesForChannelMeasurement. The higher layer parameter non-PMI-PortIndication contains a sequence $p_0^{(1)}, p_0^{(2)}, p_1^{(2)}, p_0^{(3)}, p_1^{(3)}, p_2^{(3)}, \ldots, p_0^{(R)}, p_1^{(R)}, \ldots, p_{R-1}^{(R)}$ of port indices, where $p_0^{(v)}, \ldots, p_{v-1}^{(v)}$ are the CSI-RS port indices associated with rank v and $R \in \{1, 2, \ldots, \min(8, P)\}$ where $p \in \{1, 2, 4, 8\}$ is the number of ports in the CSI-RS resource.

In one example of the embodiment Alt 2A-1, when calculating the CQI for a rank, the UE may use the ports indicated for that rank for the selected CSI-RS resource. The precoder for the indicated ports may be assumed to be the identity matrix. The configuration of different higher layer parameters is either common for all TRPs or independent for each TRP.

In one embodiment Alt 2A-2, the UE is configured to report CRI/RI/CQI per TRP, wherein one CRI is reported and RI reporting is according to at least one of the following sub-alternatives.

In one embodiment Alt 2A-2-1, rank is a fixed value, for example to 1 or to a value configured via higher layer signaling, so RI is not reported, and in other words CRI/CQI is reported according to one of the embodiments of this disclosure.

In one embodiment Alt 2A-2-2, rank can take a value from multiple values, so RI is reported. Either CRI/CQI is reported where RI is reporting implicitly with CRI or/and CQI according to one of the embodiments of this disclosure, or CRI/RI/CQI is reported according to one of the embodiments of this disclosure.

If the number of ports in the CSI-RS resource indicated by the reported CRI is more than one, then the precoder for CQI calculation can be either fixed or higher layer configured or reported by the UE, where the precoder can correspond to port selection with some scaling such as $1/\sqrt{\text{rank}}$.

In one embodiment Alt 2A-3, the UE is configured to report CRI/RI/CQI per TRP, wherein multiple CRIs are reported and RI reporting is according to at least one of the following sub-alternatives.

In one embodiment Alt 2A-3-1, rank is a fixed value, for example to 1 or to a value configured via higher layer signaling, so RI is not reported, and in other words CRI/CQI is reported according to one of the embodiments of this disclosure.

In one embodiment Alt 2A-3-2, rank can take a value from multiple values, so RI is reported. Either CRI/CQI is reported where RI is reporting implicitly with CRI or/and CQI according to one of the embodiments of this disclosure, or CRI/RI/CQI is reported according to one of the embodiments of this disclosure.

If the number of ports in the CSI-RS resources indicated by the reported CRIs is more than one, then the precoder for CQI calculation can be either fixed or higher layer configured or reported by the UE, where the precoder can correspond to port selection with some scaling such as $1/\sqrt{\text{rank}}$.

The RI reporting (in Alt 2A-1/2A-2/2A-3) can also be according to at least one of the following alternatives. In one embodiment Alt 2B-1, rank is fixed for each TRP, for example to rank 1, so RI is not reported by any TRPs. In one embodiment Alt 2B-2, RI can be reported by each TRP and the reported rank>0. In one embodiment Alt 2B-3, RI can be reported by each TRP and the reported rank can be 0 that indicates no CSI reporting or the respective TRP is not selected for CSI reporting. In one example Ex 2B-1, the primary TRP (e.g. TRP #1) has rank>0, and the secondary TRPs has rank>=0. In one example 2B-2: All TRPs have rank>=0.

In one example of Alt 2B-3, when number of TRPs is 2, the reported rank for the primary TRP (e.g. TRP #1)≥the reported rank of the secondary TRP (e.g. TRP #2). Let (RI1, RI2) be the reported RI value pair for (TRP #1, TRP #2), and let RI be the overall rank or sum of the rank values across TRPs. Then, the rank distribution across TRPs is as follows: RI=1, (RI1, RI2)=(1,0); RI=2, (RI1, RI2)=(1,1) or (2,0); RI=3, (RI1, RI2)=(2,1) or (3,0); and RI=4, (RI1, RI2)=(2,2), (3,1), or (4,0).

In another example of Alt 2B-3, when number of TRPs is 2, the rank distribution across TRPs is as follows: RI=1, (RI1, RI2)=(1,0), (0,1); RI=2, (RI1, RI2)=(1,1), (2,0), or (2,0); RI=3, (RI1, RI2)=(2,1), (3,0), (0,3), or (1,2); and RI=4, (RI1, RI2)=(2,2), (3,1), (4,0), (0,4), or (1,3).

The UE reports a joint RI or two separate RIs (RI1, RI2) either implicitly with CRI or (CRI1, CRI2) or explicitly as separate CSI component(s) RI or (RI1, RI2).

In one embodiment 3, which is a variation of embodiment 1 and 2, each CSI-RS resource is configured with a fixed number (N) of ports. For example, N=1 or 2. Hence, the reported CQI corresponds to a rank value (RI) which is a multiple of N, i.e. the rank values belong to {N, 2N, 3N, ... }. The rank value (RI) may or may not reported. If RI is reported, then the RI is reported according to one of the examples in embodiment 2. Two examples are as follows. In one example 3-1, N=1 and the possible number of layers (or rank values) belong to {1, 2, ... }. In one example 3-2, N=2 and the possible number of layers (or rank values) belong to {2, 4, ... }.

In one embodiment 4, when the UE is configured to report multiple CRI/CQI, then the UE reports multiple CRIs as explained in embodiment 1-3 of the present disclosure except that the reported CRIs has a dual-stage structure comprising two components: WB CRI component, a single CRI indicating a group or subset of CSI-RS resources is reported for the entire CSI reporting band; and SB CRI component, one CRI is reported for each subband in the CSI reporting band, where the reported CRI indicates a CRI-RS resource in the group or subset of CRI-RS resources indicated by the WB CRI component. This is similar to the dual-stage W1W2 PMI codebook to report a WB PMI (i1) and multiple SB PMIs (i2).

In one embodiment, a dual-stage CRI is reported only when the number of ports in each CSI-RS resources is large than a fixed value, e.g. 2 or 4. In another method, whether to report one CRI (single-stage) or dual-stage CRI is configured to the UE (e.g. via higher layer RRC signaling).

In one example 4-1, the UE is configured with $K_s > 1$ sets of CRI-RS resources, and the UE reports a WB CRI to indicate (select) one CSI-RS resource set (s) out of $K_s$ CSI-RS resource sets, and also reports one CRI for each SB to indicate (select) one CSI-RS resource out of $N_{CSI-RS,s}$ CSI-RS resources in the reported CSI-RS resource set (s).

In one example 4-2, the UE is configured with $K_s = 1$ set of CRI-RS resources that are grouped (e.g. fixed grouping or sequentially grouping) into T groups. The UE reports a WB CRI to indicate (select) one CSI-RS resource group (t) out of T CSI-RS resource groups in the configured resource set, and also reports one CRI for each SB to indicate (select) one CSI-RS resource out of $N_{CSI-RS,t}$ CSI-RS resources in the reported CSI-RS resource group (t).

In one example 4-3, the WB CRI indicates a subset (P) of gNBs/TRPs out of (Q) total gNBs/TRPs where P≤Q, and a SB CRI indicates a CSI-RS resource associated with the subset (P) gNBs/TRPs.

In one embodiment 5, the gNB transmits multiple ($N_{CSI-RS} > 1$) non-zero power (NZP) CSI-RS resources, each associated with 1 port, where these resources can be precoded/beamformed. The UE is configured to measure the $N_{CSI-RS}$ CSI-RS resources and report multiple WB CRIs. This configuration is via higher layer RRC signaling for example. The number of reported WB CRIs corresponds to the reported RI. The multiple CRIs are reported according to one of the following alternatives.

In one embodiment Alt 5-1, the multiple CRIs are reported jointly. At least one of the following sub-alternatives is used.

In one embodiment Alt 5-1-1, RI is reported jointly (implicitly) with the multiple CRIs, i.e. without any explicit reporting of RI value. The number of bits to report multiple CRIs and RI jointly is $$\left\lceil \log_2\left( \sum_{k=1}^{\min\{L_{max}, N_{CSI-RS}\}} \binom{N_{CSI-RS}}{k} \right) \right\rceil,$$

where $L_{max}$ is the maximum number of supported layers for the PDSCH. A few examples of joint CRI and RI indication for a few values of $L_{max}$ are shown in TABLE 1 through TABLE 4.

In one embodiment Alt 5-1-2, RI is reported separately from the multiple CRIs. An example of separate CRI and RI indication is shown in Table 5. Note that when $N_{CSI-RS}$=RI, there is no need to indicate CRIs.

In another example, joint RI and CRI (e.g., the aforementioned embodiment Alt 5-1-1) are bit-map like signaling wherein length $N_{CSI-RS}$ bitmap is used in indicate CRI(s) and RI jointly. The reported RI corresponds to the number of "1"s in the bitmap and the CRI(s) correspond to the location of those "1"s. An example is shown in TABLE 6.

In one embodiment Alt 5-2, the multiple CRIs are reported separately. At least one of the following sub-alternatives is used. In one embodiment Alt 5-2-1, RI is reported jointly (implicitly) with the multiple CRIs, i.e. without any explicit reporting of RI value. In one embodiment Alt 5-2-2, RI is reported separately from the multiple CRIs.

TABLE 1

Joint CRI/RI indication, $L_{max} = 1$

| Bit field mapped to index | CRI(s), $N_{CSI-RS} = 2$ | Bit field mapped to index | CRI(s), $N_{CSI-RS} = 3$ | Bit field mapped to index | CRI(s), $N_{CSI-RS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | reserved | 3 | 3 |

TABLE 2

Joint CRI/RI indication, $L_{max} = 2$

| Bit field mapped to index | CRI(s), $N_{CSI-RS} = 2$ | Bit field mapped to index | CRI(s), $N_{CSI-RS} = 3$ | Bit field mapped to index | CRI(s), $N_{CSI-RS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6-7 | reserved | 6 | 0, 3 |
|   |   |   |   | 7 | 1, 2 |
|   |   |   |   | 8 | 1, 3 |
|   |   |   |   | 9 | 2, 3 |
|   |   |   |   | 10-15 | reserved |

TABLE 3

Joint CRI/RI indication, $L_{max} = 3$

| Bit field mapped to index | CRI(s), $N_{CSI-RS} = 2$ | Bit field mapped to index | CRI(s), $N_{CSI-RS} = 3$ | Bit field mapped to index | CRI(s), $N_{CSI-RS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14-15 | reserved |

TABLE 4

Joint CRI/RI indication, $L_{max} = 4$

| Bit field mapped to index | CRI(s), $N_{CSI-RS} = 2$ | Bit field mapped to index | CRI(s), $N_{CSI-RS} = 3$ | Bit field mapped to index | CRI(s), $N_{CSI-RS} = 4$ |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|   |   | 4 | 0, 2 | 4 | 0, 1 |
|   |   | 5 | 1, 2 | 5 | 0, 2 |
|   |   | 6 | 0, 1, 2 | 6 | 0, 3 |
|   |   | 7 | reserved | 7 | 1, 2 |
|   |   |   |   | 8 | 1, 3 |
|   |   |   |   | 9 | 2, 3 |
|   |   |   |   | 10 | 0, 1, 2 |
|   |   |   |   | 11 | 0, 1, 3 |
|   |   |   |   | 12 | 0, 2, 3 |
|   |   |   |   | 13 | 1, 2, 3 |
|   |   |   |   | 14 | 0, 1, 2, 3 |
|   |   |   |   | 15 | reserved |

TABLE 5

Joint CRI and separate RI indication, $L_{max} = 4$
Table 1: Joint CRI and separate RI indication, $L_{max} = 4$

| Bit field mapped to index | CRI(s), $N_{CSI-RS} = 2$ | | Bit field mapped to index | CRI(s), $N_{CSI-RS} = 3$ | | | Bit field mapped to index | CRI(s), $N_{CSI-RS} = 4$ | | | |
|---|---|---|---|---|---|---|---|---|---|---|---|
| | RI = 1 | RI = 2 | | RI = 1 | RI = 2 | RI = 3 | | RI = 1 | RI = 2 | RI = 3 | RI = 4 |
| 0 | 0 | | 0 | 0 | 0, 1 | | 0 | 0 | 0, 1 | 0, 1, 2 | |
| 1 | 1 | | 1 | 1 | 0, 2 | | 1 | 1 | 0, 2 | 0, 1, 3 | |

TABLE 5-continued

Joint CRI and separate RI indication, $L_{max}$ = 4
Table 1: Joint CRI and separate RI indication, $L_{max}$ = 4

| Bit field mapped to index | CRI(s), $N_{CSI-RS}$ = 2 | | Bit field mapped to index | CRI(s), $N_{CSI-RS}$ = 3 | | | Bit field mapped to index | CRI(s), $N_{CSI-RS}$ = 4 | | | |
|---|---|---|---|---|---|---|---|---|---|---|---|
| | RI = 1 | RI = 2 | | RI = 1 | RI = 2 | RI = 3 | | RI = 1 | RI = 2 | RI = 3 | RI = 4 |
| | | | 2 | 2 | 1, 2 | | 2 | 2 | 0, 3 | 0, 2, 3 | |
| | | | 3 | reserved | reserved | | 3 | 3 | 1, 2 | 1, 2, 3 | |
| | | | | | | | 4 | | 1, 3 | | |
| | | | | | | | 5 | | 2, 3 | | |
| | | | | | | | 6 | | reserved | | |
| | | | | | | | 7 | | reserved | | |

TABLE 6 bitmap for joint CRI and RI indication, $N_{CSI-RS}$ = 4

| RI | CRI(s) | Bitmap |
|---|---|---|
| 1 | 0 | 0001 |
| 1 | 1 | 0010 |
| 1 | 2 | 0100 |
| 1 | 3 | 1000 |
| 2 | 0, 1 | 0011 |
| 2 | 0, 2 | 0101 |
| 2 | 0, 3 | 1001 |
| 2 | 1, 2 | 0110 |
| 2 | 1, 3 | 1010 |
| 2 | 2, 3 | 1100 |
| 3 | 0, 1, 2 | 0111 |
| 3 | 0, 1, 3 | 1011 |
| 3 | 0, 2, 3 | 1101 |
| 3 | 1, 2, 3 | 1110 |
| 4 | 0, 1, 2, 3 | 1111 |

In one embodiment 5A, the gNB transmits multiple ($N_{CSI-RS}$>1) non-zero power (NZP) CSI-RS resources, each associated with 2 ports, where these resources can be pre-coded/beamformed. The UE is configured to measure the $N_{CSI-RS}$ CSI-RS resources and report multiple WB CRIs. This configuration is via higher layer RRC signaling for example. The number of reported WB CRIs corresponds to the reported RI which take even number values, i.e., {2, 4, . . . }, since each CSI-RS has 2 ports, hence indicates two layers. The multiple CRIs are reported according to one of the alternatives (or their simple extension) in the aforementioned embodiment 5. The extension of the alternatives is straightforward for those skilled in the art.

In one embodiment 5B, the gNB transmits multiple ($N_{CSI-RS}$>1) non-zero power (NZP) CSI-RS resources, each associated with 1 or 2 ports, where these resources can be pre-coded/beamformed. The UE is configured to measure the $N_{CSI-RS}$ CSI-RS resources and report multiple WB CRIs. This configuration is via higher layer RRC signaling for example. The reported RI value corresponds to the (total) sum of number of ports in the reported CRIs, i.e., RI=$\Sigma_{c \in S} N_{ports}$ (c), where S is the set of reported CRIs, and $N_{ports}$(c) is the number of ports associated with the CRI c in the set S. The multiple CRIs are reported according to one of the alternatives (or their simple extension) in the aforementioned embodiment 5. The extension of the alternatives is straightforward for those skilled in the art.

In one embodiment 5C, the maximum number of CRIs that can be reported corresponds to N=1, 2, 3, or 4 that is configured to report CRI/L1-RSRP or SSBRI/L1-RSRP, where N is higher layer configured.

In one embodiment 5D, instead of reporting multiple WB CRIs as explained earlier in the present disclosure (e.g. in embodiment 5), the UE is configured to report a single WB CRI which indicates at least one of the following.

In one embodiment Alt 5D-1, a group of CSI-RS resources where the grouping is either fixed/pre-determined or higher layer configured. In one embodiment Alt 5D-2, a group of CRIs where the grouping is either fixed/pre-determined or higher layer configured. In one embodiment Alt 5D-3, a CSI-RS resource set out of multiple CSI-RS resource sets where the multiple CSI-RS resource sets are configured to the UE.

In one embodiment 5E, a UE is configured with the higher layer parameter CSIRS-SetUse of value "CodeBook" or "NonCodeBook." When the UE is configured with CSIRS-SetUse="NonCodeBook," then the UE reports multiple WB CRIs as explained in some of the embodiments of present disclosure (e.g. the aforementioned embodiment 5). When the UE is configured with CSIRS-SetUse="CodeBook." then the UE reports SB CRIs as explained in some of the embodiments of present disclosure (e.g. embodiment 1). Alternatively, when the UE is configured with CSIRS-SetUse="CodeBook." then the UE reports at least one of "CRI/RUCQI" or "LI/CRI/PMI/CQI/RI" or "CRI/PMI/CQI/RI" or "CRI/i1/CQURI" or "CRI/i1/RI."

In one embodiment 5F, the UE is configured to report a single WB CRI for each gNB/TRP out of multiple gNBs/TRPs, where the UE is configured to report CSI including CRI (e.g. CRI/CQI) for multiple gNBs/TRPs.

In one embodiment 6, the UE is configured to measure $N_g$>1 sets of CSI-RS resources for $N_g$>1 TRPS (or antenna panels): set $S_1$ comprising $N_{CSI-RS,1}$≥1 CSI-RS resources for TRP #1; set $S_2$ comprising $N_{CSI-RS,2}$≥1 CSI-RS resources for TRP #2; . . . set $S_{N_g}$ comprising $N_{CSI-RS,N_g}$≥1 CSI-RS resources from TRP #$N_g$. This configuration is either via higher layer RRC signaling or more dynamic MAC CE based or DCI based signaling.

Alternatively, the $N_g$>1 sets comprise a single CSI-RS resource set. i.e., each of the $N_g$ sets is equivalent to a subset of the single CSI-RS resource set.

The resource for interference measurement for CQI calculation/reporting is according to at least one of the following alternatives.

In one embodiment Alt 6-1, the UE is not configured with any additional resources for interference measurement, and the UE measures both channel and interference using the $N_g$>1 sets of CSI-RS resources.

In one embodiment Alt 6-2, the UE is configured with additional resource(s) for interference measurement. At least one of the following example is used.

In one example Ex 6-1, the UE is configured with $N_g$>1 sets of CSI-RS resources for channel measurement and CSI-IM resource(s) for interference measurement, where CSI-IM resource(s) is (are) configured for either all or a subset of the $N_g$ TRPs.

In one example Ex 6-2, the UE is configured with $N_g>1$ sets of NZP CSI-RS resources for channel measurement and zero power (ZP) CSI-RS resource(s) for interference measurement, where ZP CSI-RS resource(s) is (are) configured for either all or a subset of the $N_g$ TRPs.

In one example Ex 6-3, the UE is configured with $N_g>1$ sets of NZP CSI-RS resources for channel measurement and additional sets of NZP CSI-RS resource(s) for interference measurement, where the additional sets of NZP CSI-RS resource(s) is (are) configured for either all or a subset of the $N_g$ TRPs.

The UE is then configured to report multiple CRI/CQI (as provided earlier in the present disclosure) to at least one of the $N_g>1$ TRPs. As an example, the UE is configured to report multiple CRI/CQI (as provided earlier in the present disclosure) for each of the $N_g>1$ TRPs. This configuration is either via higher layer RRC signaling or more dynamic MAC CE based or DCI based signaling.

At least one of the following alternatives is used to report $N_g$ CSI reports.

In one embodiment Alt 6A-1, each of the $N_g$ CSI reports is derived using the corresponding set of the CSI-RS resources (i.e. CSI-RS resource sets are one-to-one mapped to the CSI reports).

In one embodiment Alt 6A-2, at least one of the $N_g$ CSI reports is derived using multiple sets of CSI-RS resources. For example, if $N_g=2$, then the CSI report for TRP #1 can be derived using both sets ($S_1$ and $S_2$) of CSI-RS resources; and likewise, the CSI report for TRP #2 can also be derived using both sets of CSI-RS resources. Such linking of multiple CSI-RS resource sets to derive a CSI report can be configurable, for example, via higher layer signaling or more dynamic MAC CE based or DCI based signaling.

When the UE is configured to report CSI for each of multiple ($N_g$) gNBs/TRPs (e.g. for non-coherent joint transmission from multiple gNBs/TRPs), where the configuration is either joint for all TRPs or independent for each TRP, then the UE may report a single joint CSI report comprising CSI reports for all TRPs, for example, to the primary TRP (or TRP #1). Or, the UE may report an independent CSI report for each TRP, for example, to the respective TRP.

In one example of CSI report, the configuration includes the higher layer parameter ReportQuantity set to "CRI/CQI," and the UE may report a single or multiple "CRI/CQI" according to at least one of alternatives provided in this disclosure (e.g. the aforementioned one of embodiments Alt 1-1 through Alt 1-7). In one example, a single joint CSI report comprising CRI/CQI for all TRPs is reported, for example, to the primary TRP (or TRP #1). In another example, an independent CRI/CQI report for each TRP is reported, for example, to the respective TRP.

In another example of CSI report, the configuration includes the higher layer parameter ReportQuantity set to "CRI/L1-RSRP," and the UE may report a single joint CSI report comprising CRI/L1-RSRP for all TRPs or an independent CRI/CQI report for each TRP.

The UCI carrying the CSI for multiple ($N_g$) gNBs/TRPs can be divided (partitioned) into two parts: part 1 and part 2, where UCI part 1 carries a subset of the CSI reports for multiple gNBs/TRPs (i.e., CSI part 1), and the UCI part 2 carries the remaining CSI reports for multiple gNBs/TRPs (i.e. CSI part 2). The CSI part 1 has fixed payload (number of bits) and the corresponding UCI part 1 is always reported. The CSI part 2 can have variable payload (number of bits) and the corresponding UCI part 2 may or may not be reported. For example, UCI part 2 is not reported if CSI part 2 has zero payload (i.e. not reported).

The information about the size of the CSI part 2 or UCI part 2 is included in the UCI or CSI part 1. In one example, the information includes a number (N) of TRPs (out of the total $N_g$) whose CSIs are reported in UCI part 2. In another example, the information includes a number ($N_2$) of TRPs (out of the remaining $N_g$ $N_1$) whose CSIs are reported in UCI part 2, where $N_1$ and $N_2$ respectively are number of TRPs whose CSIs are included in UCI part 1 and part 2. In another example, the information includes a bitmap that indicates whether CSI for a TRP associated with UCI part 2 is reported or not. The length of the bitmap can be $N_2$. The information about the size of the CSI part 2 or UCI part 2 can be explicit as a separate CSI component in CSI part 1 or implicit with one of the CSI components in CSI part 1, for example with RI (if reported) or with CRI.

UCI part 1 and UCI part 2 are reported according to at least one of the following alternatives.

In one embodiment Alt 6B-1, UCI part 1 and UCI part 2 are reported to the primary TRP (e.g. TRP #1) only, and not to other TRPs.

In one embodiment Alt 6B-2, UCI part 1 and UCI part 2 are reported to the primary TRP (e.g. TRP #1) only, and UCI part 2 is reported to one of the remaining TRPs.

In one embodiment Alt 6B-3, UCI part 1 is reported to the primary TRP (e.g. TRP #1) only, and UCI part 2 is reported to one of the remaining TRPs.

In one example, UCI part 1 carries the CSI for the primary TRP (i.e. TRP #1), and also includes the information about the number ($N_2 \geq 0$) of the remaining TRPs (e.g. TRP #i, where i>1) whose CSIs are reported using UCI part 2. The UCI part 2 carries CSIs of the $N_2$ of the remaining TRPs (e.g. TRP #i, where i>1). Note that UCI part 2 payload varies (since $N_2$ varies), in particular, UCI part 2 is not reported if $N_2=0$. If $N_g>2$ and $N_g-1>N_2$ (i.e., number of remaining TRPs>number of TRPs whose CSI is reported via UCI part 2), then an indication is needed to indicate the indices of the TRPs whose CSIs are reported.

In another example, UCI part 1 carries the CSI for the primary TRP (i.e. TRP #1), and also includes the information (e.g. a bitmap) about the indices of the TRPs whose CSIs are reported using UCI part 2. The UCI part 2 carries CSIs of the $N_2$ of the remaining TRPs (e.g. TRP #i, where i>1). Note that UCI part 2 payload varies (since $N_2$ varies), in particular, UCI part 2 is not reported if $N_2=0$.

The reasons to support variable $N_2$ are as follows. In one example of the reasons, the first is the case in which the DL channel for some TRPs are so weak (when compared with other TRPs) that there is no benefit of data transmission from such weak TRPs. This can happen due to blockage (e.g. in millimeter wave or FR2 communication) or strong interference. In another example of the reasons is the case in which a UE can't support simultaneous PDSCH reception from all configured ($N_g$) TRPs.

In a variation, the UCI carrying the CSI for multiple ($N_g$) gNBs/TRPs can be divided (partitioned) into $N_g$ parts, where UCI part i carries CSI part i corresponding to the CSI of the i-th gNB/TRP. The CSI part 1 has fixed payload (number of bits) and the corresponding UCI part 1 is always reported. The CSI part i (i>1) also has a fixed payload (number of bits) but the CSI part i may or may not be reported. The corresponding UCI part i therefore has fixed payload if CSI part i is reported and CSI part i is not reported if CSI part i is not reported.

The information about the size of the CSI part i or UCI part i is included in the UCI or CSI part 1. In one example, the information includes a number (N) of TRPs (out of the total $N_g$) whose CSIs are reported in UCI part i (i>1). In another example, the information includes a number ($N_2$) of TRPs (out of the remaining $N_g-N_1$) whose CSIs are reported in UCI part i (i>1), where $N_1$ and $N_2$ respectively are number of TRPs whose CSIs are included in UCI part 1 and UCI part i (i>1). In another example, the information includes a bitmap that indicates whether CSI for a TRP associated with UCI part i (i>1) is reported or not. The length of the bitmap can be $N_2$.

UCI part 1 and UCI part i (i>1) are reported according to at least one of the following alternatives. In one example Alt 6C-1, UCI part 1 and UCI part i (i>1) are reported to the primary TRP (e.g. TRP #1) only, and not to other TRPs. In another example Alt 6C-2, UCI part 1 and UCI part i (i>1) are reported to the primary TRP (e.g. TRP #1) only, and UCI part i (i>1) is reported to the respective TRP i. In yet another example Alt 6C-3, UCI part 1 is reported to the primary TRP (e.g. TRP #1) only, and UCI part i (i>1) is reported to one of the remaining TRP i.

In one embodiment 6A, the UE is configured to measure $N_g>1$ sets of CSI-RS resources or $N_g>1$ TRPs (or antenna panels) as explained in embodiment 6 above, and the UE is further configured with the higher layer parameter ReportQuanity set to "CRI/X" for CSI reporting, then the UE may report "CRI/X" as CSI report for each resource set (or TRP) as follows. The CSI report for each TRP comprises {CRI, X}, where CRI can take zero value (i.e., CRI=0 indicating zero resource selection, i.e., CSI is not reported for that TRP). When CRI=0, X is not reported, i.e., only CRI is reported. Also, the UE may not report CRI=0 for all $N_g$ TRPs. In other words, the UE may report {CRI, X} where CRI>0 for at least one TRP. Also, CRI can be reported independent per TRP or joint across TRPs. The quantity X is either CQI or RI/CQI or RUCQI/PMI or RI/CQI/PMI/LI.

When X=CQI, the overall RI (total number of layers across TRPs) is not reported, and equals number of resource(s) indicated via CRI(s) or sum of the number of ports associated with the resource(s) indicated via CRI(s). An important use case for such non-PMI feedback for multi-TRP is when there are large number of TRPs, each with small number of ports (e.g. 1), which is relevant for FR2 and URLLC scenarios, potentially with channel reciprocity.

In one example, when X=CQI, CRI is reported in a WB manner and CQI is reported either WB or per SB (e.g. based on higher layer configuration).

In a variation of this embodiment, the UE can also be configured with $N_g=1$ set of CSI-RS resources for $N_g=1$ TRP (or antenna panel). In another variation of this embodiment, whether CRI can take zero value (i.e., CRI=0 indicating zero resource selection, i.e., CSI is not reported for that TRP) or CRI>0 is configured to the UE (e.g. via higher layer RRC, or dynamic DCI based signalling). In another variation of this embodiment, whether CRI can take zero value (i.e., CRI=0 indicating zero resource selection, i.e., CSI is not reported for that TRP) or CRI>0 is depends on the value of $N_g$. For example, CRI can take zero value if $N_g>0$ and CRI>0 if $N_g=1$.

In one embodiment 6B, the UE is configured to measure $N_g>1$ sets of CSI-RS resources or $N_g>1$ TRPs (or antenna panels) as explained in embodiment 6 above, and the UE is further configured with the higher layer parameter ReportQuantity set to "RI/X" for CSI reporting, then the UE may report "RI/X" as CSI report for each resource set (or TRP) as follows. The CSI report for each TRP comprises {RI, X}, where RI can take zero value (i.e., RI=0 indicating CSI is not reported for that TRP). When RI=0, X is not reported, i.e., only RI is reported. Also, a UE may not report RI=0 for all $N_g$ TRPs. In other words, a UE may report {RI, X} where RI>0 for at least one TRP. Also, RI can be reported independent per TRP or joint across TRPs. The quantity X is either CQI or CRUCQI or CRUCQI/PMI or CRI/CQI/PMI/LI. The overall RI (total number of layers across TRPs) equals sum of all RIs for all TRPs.

In one example, when X=CQI, RI is reported in a WB manner and CQI is reported either WB or per SB (e.g. based on higher layer configuration).

In a variation of this embodiment, the UE can also be configured with $N_g=1$ set of CSI-RS resources for $N_g=1$ TRP (or antenna panel). In another variation of this embodiment, whether RI can take zero value (i.e., RI=0 indicating CSI is not reported for that TRP) or RI>0 is configured to the UE (e.g. via higher layer RRC, or dynamic DCI based signalling). In another variation of this embodiment, whether RI can take zero value (i.e., RI=0 indicating CSI is not reported for that TRP) or RI>0 is depends on the value of $N_g$. For example, RI can take zero value if $N_g>0$ and RI>0 if $N_g=1$.

In one embodiment 6C, the UE is configured to measure $N_g>1$ sets of CSI-RS resources or $N_g>1$ TRPs (or antenna panels) as explained in embodiment 6 above, and the UE is further configured with the higher layer parameter ReportQuantity set to "CRI/RI/X" for CSI reporting, then the UE may report "CRI/RI/X" as CSI report for each resource set (or TRP) as follows. The CSI report for each TRP comprises {CRI, RI, X}, where both CRI and RI can take zero value simultaneously (i.e., CRI=RI=0 indicating zero resource selection, i.e., CSI is not reported for that TRP) but only one of them can't be zero, i.e., (CRI, RI)=(0,1) or (1,0) can't be reported. In other words, (CRI, RI) is either (0,0) or (a,b) where a>0 and b>0. When CRI=RI=0, X is not reported, i.e., only (CRI, RI)=(0,0) is reported. Also, a UE may not report CRI=RI=0 for all $N_g$ TRPs.

In other words, a UE may report {CRI, RI, X} where RI>0 and CRI>0 for at least one TRP. For each TRP, (CRI, RI) can be jointly encoded for reporting purpose. Or, CRI and RI are encoded separately. Also, (CRI, RI) can be reported independent per TRP or joint across TRPs. The quantity X is either CQI or CQI/PMI or CQI/PMI/LI. When X=CQI, the overall RI (total number of layers across TRPs) equals sum of all RIs for all TRPs.

In one example, when X=CQI, CRI is reported in a WB manner and CQI is reported either WB or per SB (e.g. based on higher layer configuration).

In a variation of this embodiment, the UE can also be configured with $N_g=1$ set of CSI-RS resources for $N_g=1$ TRP (or antenna panel). In another variation of this embodiment, whether CRI and RI can take zero value (i.e., CRI=RI=0 indicating zero resource selection, i.e., CSI is not reported for that TRP) or CRI, RI>0 is configured to the UE (e.g. via higher layer RRC, or dynamic DCI based signalling). In another variation of this embodiment, whether CRI and RI can take zero value (i.e., CRI=RI=0 indicating zero resource selection, i.e., CSI is not reported for that TRP) or CRI, RI>0 is depends on the value of $N_g$. For example, CRI and RI can take zero value if $N_g>0$ and CRI, RI>0 if $N_g=1$.

In one embodiment 7, the UE is configured to measure multiple CSI-RS resources (either in one CSI-RS resource set or in multiple CSI-RS resource sets), each with a fixed number of ports (e.g. 1 port), where these resources can be pre-coded/beamformed. The UE is configured to report multiple CRIs (either alone or with CQI, i.e., CRI/CQI) according to at least one of the following alternatives (1 port CSI-RS resources are assumed in these alternatives for illustration only).

In one embodiment Alt 7-1, multiple N>1 CRIs, (CRI$_1$, CRI$_2$, . . . , CRI$_N$), are reported such that the multiple is considered only in the spatial domain (i.e., N CRIs correspond to N layers) and not in the frequency domain (i.e., reported CRIs or layers are wideband). In other words, the reported N CRIs are WB, and the reported N CRIs indicate N layers.

In one example 7-1-1, N>1 CRIs indicate N>1 layers (1 CRI for each layer), where layers are formed using a single antenna panel (i.e. all antenna ports belong to a single antenna panel).

In one example 7-1-2: N>1 CRIs indicate N>1 layers (1 CRI for each layer), where N layers are formed using N antenna panels (or N TRPs). In one alternative, N layers are one-to-one mapped to N antenna panels (or N TRPs). In another alternative, at least one of N layers maps to multiple antenna panels (or TRPs). The number of reported CRIs corresponds to the reported RI. The RI may or may not reported with CRIs. The multiple CRIs are reported according to one of the following alternatives in the aforementioned embodiment 5.

In one example Alt 7-2, multiple M>1 CRIs, (CRI$_1$, CRL$_2$, . . . , CRI$_M$), are reported such that the multiple is not considered in the spatial domain (i.e., the number of layers is the same in all reported CRIs) and is considered only in the frequency domain (i.e., M CRIs correspond to M parts of the system bandwidth or CSI reporting bandwidth). In other words, 1 CRI is reported for each of the M parts of the system bandwidth or CSI reporting bandwidth.

In one example 7-2-1, M CRIs one-to-one correspond to M bandwidth parts (e.g. 2 CRIs are reported for 2 bandwidth parts where CRI to bandwidth part mapping is one-to-one). In one example 7-2-2, M CRIs one-to-one correspond M SBs (e.g. CRI replaces SB PMI reporting).

In one example Alt 7-3, multiple NM>1 CRIs, (CRI$_{1,1}$, CRI$_{1,2}$, . . . , CRI$_{1,N}$, CR$_{2,1}$, CRI$_{2,2}$, . . . , CRI$_{2,N}$, . . . , CRI$_{M,1}$, CRI$_{M,2}$, . . . , CRI$_{M,N}$), are reported such that the multiple is considered in both the spatial domain and the frequency domain. In other words, N CRIs are reported for each of the M parts of the system bandwidth or CSI reporting bandwidth, where N CRIs correspond to N layers.

In a variation, when the UE is configured to report CSI for multiple (N$_g$) gNBs/TRPs (e.g. for non-coherent joint transmission from multiple gNBs/TRPs, and the UE is further configured to report multiple CRIs in spatial domain, then embodiment 7 (Alt 7-1, Alt 7-3) can be extended according to at least one of the following alternatives.

In one example Alt 7A-1, multiple CRIs are reported in spatial domain, where CRIs correspond to a single TRP. In one example Alt 7A-2, multiple CRIs are reported in spatial domain, where 1 CRI is reported for each of the multiple TRPs. In one example Alt 7A-3, multiple CRIs are reported in spatial domain, where more than 1 CRIs can be reported for each of the multiple TRPs.

In one embodiment 8, a UE is configured with the higher layer parameter SRS-SetUse="NonCodeBook," then the UE is indicated with multiple SRIs (via UL-related DCI signaling) for UL MIMO transmission. The multiple SRIs are determined/indicated according to some of the embodiments of present disclosure (e.g. the aforementioned embodiment 1-7) except that CSI-RS and CRI are replaced with SRS and SRI respectively. For instance, the UE reports multiple SRIs according to at least one of the following alternatives.

In one embodiment Alt 8-1, if the higher layer parameter SRI-FormatIndicator indicates a single WB SRI reporting, then a single SRI is reported for the entire CSI reporting band (i.e., the reported SRI is are WB).

In one embodiment Alt 8-2, if the higher layer parameter SRI-FormatIndicator indicates multiple WB SRIs reporting, then multiple SRIs are reported for the entire CSI reporting band (i.e., the reported SRIs are WB).

In one embodiment Alt 8-3, if the higher layer parameter SRI-FormatIndicator indicates multiple SB CRIs reporting, then at least one SRI is reported for each subband in the CSI reporting band (i.e., the reported SRIs are SB). In one example, exactly one SRI is reported for each SB. In another example, multiple SRIs can be reported in one SB. Also, the number of SRIs in each SB can be the same (hence is WB in nature), and may determine the WB rank (TRI) value for UL transmission. Alternatively, the number of SRIs in each SB can changes from one SB to another SB (hence is SB in nature), and may determine the SB rank (TRI) value for UL transmission.

Note that at least one of these alternatives (e.g. the aforementioned embodiments Alt 8-1 to Alt 8-3) is configured via higher layer signaling (RRC). For example, the signaling can be via the parameter SRI-FormatIndicator.

In a variation, the frequency granularity to report multiple SRIs is according to at least one of the following alternatives. In one example Alt 8-4, the frequency granularity is equal to the subband size. In one example Alt 8-5, the frequency granularity is smaller than the subband size, for example, equal to an RB. In one example Alt 8-6, the frequency granularity is larger than the subband size, for example, a multiple of subband size. In one example Alt 8-7, the frequency granularity is a fixed fraction (1/r) of the entire CSI reporting band, for example, ½ or ¼ or ⅛. One of these alternatives is either fixed (e.g. the aforementioned embodiment Alt 8-4) or configured (e.g. via higher layer RRC signaling).

In one embodiment 8A, the reported SRI (or SRIs) indicates a SRS resource (or indicate SRS resources) associated with a small number of SRS ports (e.g. 1 or 2). The UE is configured with N$_{SRS}$≥1 SRS resources via higher layer signaling. Note that when N$_{SRS}$=1, then SRI does not need to be reported. In one method, N$_{SRS}$>1 when the UE is indicated with multiple SRIs. In another method, N$_{CSI-RS}$≥1 when the UE is indicated with multiple SRIs. One of the two methods may be supported in the specification.

In one embodiment 8B, the reported SRI (or SRIs) determines a rank value (TRI) that is equal to the sum of number of ports associated with the SRS resources indicated by the reported SRIs. Note that there is no need for TRI indication since TRI is indicated implicitly via the indication of multiple SRIs.

In one embodiment 8C, the number of ports associated with each of the N$_{SRS}$ SRS resources is according to at least one of the following alternatives. In one embodiment Alt 8C-1, the number of ports is the same for all N$_{SRS}$ resources. Therefore, the reported SRI (or SRIs) corresponds to a fixed rank (TRI) that does not change across SBs, i.e., rank value is WB. In one embodiment Alt 8C-2, the number of ports can be different from one resource to another. Therefore, if multiple SRIs are reported, then the rank (TRI) assumption can change from SB to another. For example, TRI in one SB can correspond to rank 1 (if the corresponding reported SRI indicates a 1-port resource) and TI in another SB can correspond to rank 2 (if the corresponding reported SRI indicates a 2-port resource).

One use case of multiple SRI reporting is the case in which the precoding or beamforming of UL data is in at least one of two domains (1) radio frequency (RF) or analog domain and (2) digital or baseband domain. The $N_{SRS}$ SRS resources can be beamformed using $N_{SRS}$ beamforming vectors. These beamforming vectors can be obtained by the UE by measuring DL RS (e.g. CSI-RS) transmitted by the gNB (relying on UL-DL reciprocity). An example of such a system is high frequency (such as millimeter wave) system.

Another use case is hybrid CSI in which the gNB indicates the following two UL-related CSI reports (e.g. in DCI). In one example, the first UL-related CSI report includes a long term and WB UL CSI indicating the information about a subspace or a set of candidate beamforming vectors. An example of subspace reporting is $i_1$ only reporting which indicates a set of DFT beams. In one example, the second CSI includes the SRI(s) as provided in this embodiment (embodiment 8). The SRS resources for this second UL-related CSI reporting are beamformed or precoded using the subspace or the set of candidate beamforming vectors reported in the first CSI report.

A few advantages/benefits of multiple SRI reporting (using beamformed SRS) over multiple TPMI reporting (using non-precoded or non-beamformed SRS and TPMI UL codebook) are as follows. In one example, the first advantage is in terms of performance gain wherein multiple SRI reporting is expected to show performance gain over multiple TPMI reporting. This is because of the fact that beamformed SRS can achieve more SINR at the gNB when compared with non-precoded SRS. In one example, the second advantage is that any beamforming or precoding vector can be used to beamform the SRS resources. In particular, reliance on a codebook such as TPMI UL codebook to beamform these resources is not necessary. In one example, the third advantage is that multiple SRIs can reduce DCI overhead (bits) when compared with the overhead of indicating multiple TPMIs in DCI.

In one embodiment 9, the RI reporting alternatives in embodiment 2 is extended (applicable) to report TRI indication (e.g. via DCI signaling) either implicitly (e.g. via a joint filed for SRI and TRI in DCI) or explicitly (e.g. via a separate field in DCI).

In one embodiment 10, which is a variation of the aforementioned embodiments 8 and 9, each SRS resource is configured/associated with a fixed number (N) of ports. For example, N=1 or 2. Hence, the reported SRI corresponds to a rank value (TRI) which is a multiple of N, i.e. the rank values belong to {N, 2N, 3N, . . . }. The rank value (TRI) may or may not reported. If TRI is reported, then the TRI is reported according to one of the examples in the aforementioned embodiment 9. Two examples are as follows. In one example Ex 10-1: N=1 and the possible number of layers (or rank values, TRI) belong to {1, 2, . . . }. In one example Ex 10-2: N=2 and the possible number of layers (or rank values, TRI) belong to {2, 4, . . . }.

In one embodiment 11, when the UE is indicated with multiple SRIs (e.g. via DCI), then the UE is indicated with multiple CRIs as explained in the aforementioned embodiments 8 to 10 of the present disclosure except that the indicated SRIs has a dual-stage structure comprising two components. In one example of WB SRI component, a single SRI indicating a group or subset of SRS resources is reported for the entire CSI reporting band. In one example of SB SRI component: one SRI is reported for each subband in the CSI reporting band, where the reported SRI indicates a SRS resource in the group or subset of SRS resources indicated by the WB SRI component.

This is similar to the dual-stage W1W2 PMI codebook to report a WB PMI (i1) and multiple SB PMIs (i2).

In one embodiment, a dual-stage SRI is indicated only when the number of ports in each SRS resource is large than a fixed value, e.g. 2 or 4. In another method, whether to indicate one SRI (single-stage) or dual-stage SRI is indicated to the UE (e.g. via higher layer RRC signaling).

In one example 11-1, the UE is configured with $K_s>1$ sets of SRS resources, and the UE is indicated with a WB CRI to indicate (select) one SRS resource set (s) out of $K_s$ SRS resource sets, and is also indicated with one SRI for each SB to indicate (select) one SRS resource out of $N_{SRS,s}$ SRS resources in the reported SRS resource set (s).

In one example 11-2, the UE is configured with $K_s=1$ set of SRS resources which are grouped (e.g. fixed grouping or sequentially grouping) into T groups. The UE is indicated with a WB SRI to indicate (select) one SRS resource group (t) out of T SRS resource groups in the configured resource set, and is also indicated with one SRI for each SB to indicate (select) one SRS resource out of $N_{SRS,t}$ SRS resources in the reported SRS resource group (t).

In one embodiment 12, a UE is configured (e.g. via RRC) to measure a DL resource set comprising $N_{RS}>1$ DL resources for DL CSI acquisition/reporting. The UE is further configured (e.g. via RRC) to report a single or multiple DL resource indicator (DRI or DRIs) indicating one or multiple of the DL resources in the configured DL resource set. An example of DL RS is CSI-RS in which case DRI corresponds to CRI.

In one embodiment 12A, a UE is configured (e.g. via RRC) to measure multiple DL resource sets, each comprising $N_{RS}>1$ DL resources for DL CSI acquisition/reporting. The UE is further configured (e.g. via RRC) to report a single or multiple DL resource indicator (DRI or DRIs) indicating one or multiple of the DL resources in the configured DL resource sets. An example of DL RS is CSI-RS in which case DRI corresponds to CRI.

In one embodiment 13, a UE is configured (e.g. via RRC) to transmit a UL resource set comprising $N_{RS}>1$ UL resources for UL CSI acquisition. The UE is then indicated with (e.g. via DCI) a single or multiple UL resource indicator (URI or URIs) indicating one or multiple of the UL resources in the configured UL resource set. An example of UL RS is SRS in which case URI corresponds to URI.

In one embodiment 13A, a UE is configured (e.g. via RRC) to transmit multiple UL resource sets, each comprising $N_{RS}>1$ UL resources for UL CSI acquisition. The UE is then indicated with (e.g. via DCI) a single or multiple UL resource indicator (URI or URIs) indicating one or multiple of the UL resources in the configured UL resource sets. An example of UL RS is SRS in which case URI corresponds to URI.

Figure 12:
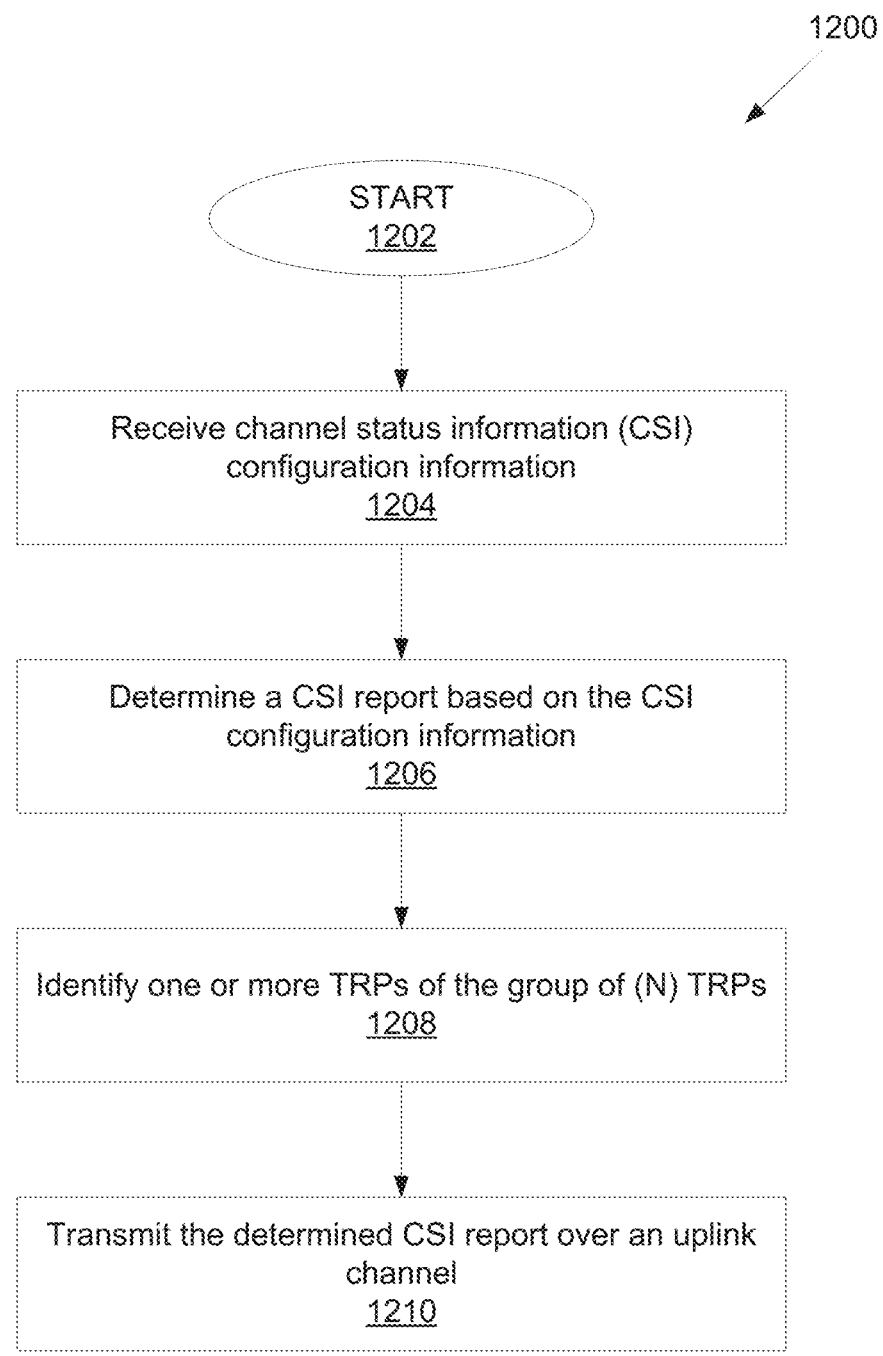
FIG. 12 illustrates a flow chart of a method for CSI acquisition according to embodiments of the present disclosure.

FIG. 12 illustrates a flowchart of a method 1200 for CSI acquisition according to embodiments of the present disclosure, as may be performed by a user equipment (UE). The embodiment of the method 1200 illustrated in FIG. 12 is for illustration only. FIG. 12 does not limit the scope of this disclosure to any particular implementation.

As illustrated in FIG. 12, the method 1200 begins at step 1202. In step 1204, a UE (e.g., 111-116 as illustrated in FIG. 1) receives, from at least one transmission and reception point (TRP) of a group of (N) TRPs, channel status information (CSI) configuration information.

In step 1206, the UE determines a CSI report based on the CSI configuration information. In this step, the determined CSI report includes a TRP indicator for selecting (M) TRPs of the group of (N) TRPs. In one embodiment, the CSI report further includes CSI for each of the selected (M) TRPs. In such embodiment N is greater than one, and wherein M is greater or equal to 1, and less or equal to N.

In one embodiment, the CSI report further includes a number (M) of selected TRPs for CSI reporting. In one embodiment, the CSI configuration information includes a number (M) of selected TRPs for CSI reporting.

In one embodiment, the CSI report is partitioned into CSI1 comprising CSI for N1 TRPs and CSI2 comprising CSI for N2 TRPs.

In one embodiment, the CSI report is transmitted via an uplink control information (UCI) comprising two parts of UCI1 and UCI2. In such embodiment, N1 is a fixed number greater or equals to one regardless of a value of M, N2 is greater or equals to zero, and equals to M−N1.

In one embodiment, the UCI1 includes the CSI1 and a UCI indicator for indicating a number of information bits for the UCI2, and the payload of UCI1 transmission in terms of number of information bits is fixed and the UCI2, and the payload of UCI2 transmission in terms of number of information bits is variable.

In one embodiment, the UCI indicator for indicating the number of information bits of the UCI2 comprises a bitmap $b_1 b_2 \ldots b_N$ of length N. In such embodiment, the bitmap comprises M ones and N−M zeros. In such embodiment, CSI for an i-th TRP is not included in the determined CSI report when a $b_1$ is set to zero and CSI for an i-th TRP is included in the determined CSI report when a $b_1$ is set to one.

In one embodiment, the UE measures N sets of CSI-reference signal (CSI-RS) resources, one set for each of the group of (N) TRPs.

In one embodiment, the UE determines based on the CSI configuration information, the CSI report including a CSI-RS resource indicator (CRI) that indicates M of the N sets of CSI-RS resources, and CSI for each of the M CSI-RS resources.

In one embodiment, the CRI comprises N components, $CRI_1, CRL_2, \ldots,$ and $CRI_N$, M of which are greater than zero and remaining N−M are zero. In such embodiment, CSI for an i-th set of CSI-RS resources is not included in the determined CSI report when CRI, is set to zero; and CSI for an i-th set of CSI-RS resources is included in the determined CSI report when CRI, is greater than zero, and the CSI comprises at least one of channel quality indicator (CQI), a rank indicator (RI), a precoding matrix indicator (PMI), or a layer indicator (LI).

In step 1208, the UE identifies, based on the configuration information, one or more TRPs of the group of (N) TRPs to transmit the determined CSI report.

In step 1210, the UE transmits, to the one or more TRPs, the determined CSI report over an uplink channel.

In one embodiment, the UE in step 1210 further transmits, to the one or more selected TRPs, the determined CSI report including the CRI and the CSI for each of the M CSI-RS resources.

Figure 13:
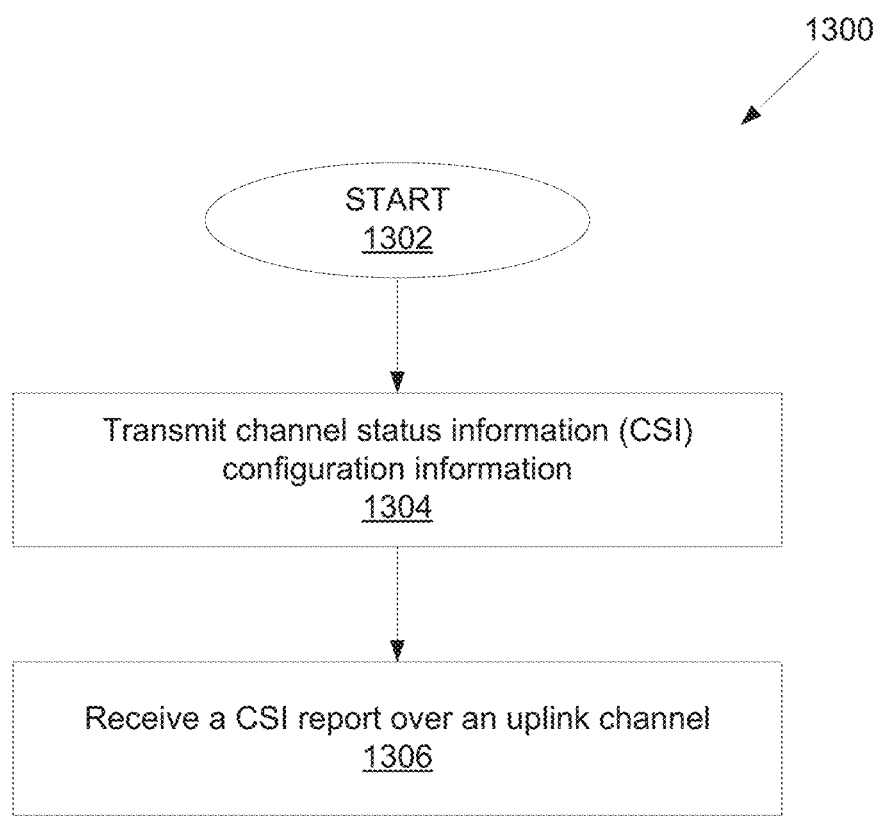
FIG. 13 illustrates a flow chart of another method for CSI acquisition according to embodiments of the present disclosure.

FIG. 13 illustrates a flowchart of another method 1300 for CSI acquisition according to embodiments of the present disclosure, as may be performed by a transmission/reception point (TRP). The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1304, a TRP (e.g., 101-103 as illustrated in FIG. 1) transmits, a user equipment (UE), channel status information (CSI) configuration information, wherein the TRP is at least one TRP of a group of (N) TRPs.

In step 1304, the CSI configuration information includes a number (M) of selected TRPs for CSI reporting.

In step 1306, the TRP receives, from the UE, a CSI report over an uplink channel. In step 1306, the CSI report is determined based on the CSI configuration information. In one embodiment, the CSI report includes a TRP indicator for selecting (M) TRPs of the group of (N) TRPs, and CSI for each of the selected (M) TRPs. In such embodiment, N is greater than one, and M is greater or equal to 1, and less or equal to N.

In one embodiment, the CSI report further includes a number (M) of selected TRPs for CSI reporting.

In one embodiment, the CSI report is partitioned into CSI1 comprising CSI for N1 TRPs and CSI2 comprising CSI for N2 TRPs.

In one embodiment, the CSI report is transmitted via an uplink control information (UCI) comprising two parts of UCI1 and UCI2. In such embodiments, N1 is a fixed number greater or equals to one regardless of a value of M and N2 is greater or equals to zero, and 1 equals to M−N1. In such embodiment, the UCI1 includes the CSI1 and a UCI indicator for indicating a number of information bits for the UCI2, and the payload of UCI1 transmission in terms of number of information bits is fixed. In such embodiment, the UCI2 includes the CSI2 and the payload of UCI2 transmission in terms of number of information bits is variable.

In one embodiment, the UCI indicator for indicating the number of information bits of the UCI2 comprises a bitmap $b_1 b_2 \ldots b_N$ of length N. In such embodiment, the bitmap comprises M ones and N−M zeros.

In one embodiment, CSI for an i-th TRP is not included in the determined CSI report when a $b_i$ is set to zero.

In one embodiment, CSI for an i-th TRP is included in the determined CSI report when a $b_i$ is set to one.

In step 1306, the TRP further receives, from the UE, the determined CSI report including a CSI-RS resource indicator (CRI) and the CSI for each of M CSI-RS resources.

In one embodiment, the CSI report includes the CRT that indicates M of the N sets of CSI-RS resources, and CSI for each of the M CSI-RS resources. In such embodiment, the N sets of the CRI resources is measured, by the UE, one set for each of the group of (N) TRPs.

In one embodiment, the CRI comprises N components, $CRI_1, CRL_2, \ldots,$ and $CRI_N$, M of which are greater than zero and remaining N−M are zero. In such embodiment, CSI for an i-th set of CSI-RS resources is not included in the determined CSI report when CRI, is set to zero, and CSI for an i-th set of CSI-RS resources is included in the determined CSI report when CRI, is greater than zero. In such embodiment, the CSI comprises at least one of channel quality indicator (CQI), a rank indicator (RI), a precoding matrix indicator (PMI), or a layer indicator (LI).

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
a transceiver configured to receive, from at least one transmission and reception point (TRP) of a group of (N) TRPs, channel status information (CSI) configuration information; and
a processor operably connected to the transceiver, the processor configured to:
determine a CSI report based on the CSI configuration information; and
identify, based on the CSI configuration information, one or more TRPs of the group of (N) TRPs to transmit the determined CSI report,
wherein the transceiver is further configured to transmit, to the identified one or more TRPs, the determined CSI report over an uplink channel,
wherein the determined CSI report includes a TRP indicator for selecting (M) TRPs of the group of (N) TRPs and CSI for each of the selected (M) TRPs,
wherein N is greater than one, and
wherein M is greater or equal to 1, and less or equal to N.

2. The UE of claim 1, wherein the determined CSI report further includes a number (M) of selected TRPs for CSI reporting.

3. The UE of claim 1, wherein the CSI configuration information includes a number (M) of selected TRPs for CSI reporting.

4. The UE of claim 1, wherein:
the determined CSI report is partitioned into CSI1 comprising CSI for N1 TRPs and CSI2 comprising CSI for N2 TRPs;
the determined CSI report is transmitted via an uplink control information (UCI) comprising two parts, UCI1 and UCI2;
N1 is a fixed number greater or equal to one regardless of a value of M;
N2 is greater or equal to zero, and equal to M−N1;
the UCI1 includes the CSI1 and a UCI indicator for indicating a number of information bits for the UCI2, and a payload of UCI1 transmission in terms of number of information bits is fixed; and
the UCI2 includes the CSI2, and a payload of UCI2 transmission in terms of number of information bits is variable.

5. The UE of claim 4, wherein:
the UCI indicator for indicating the number of information bits of the UCI2 comprises a bitmap, $b_1$ through $b_N$, of length N;
the bitmap comprises M ones and N-M zeros;
CSI for an i-th TRP is not included in the determined CSI report when a $b_i$ is set to zero; and
CSI for an i-th TRP is included in the determined CSI report when a $b_i$ is set to one.

6. The UE of claim 1, wherein:
the processor is further configured to:
measure N sets of CSI-reference signal (CSI-RS) resources, one set for each of the group of (N) TRPs, and
determine, based on the CSI configuration information, the CSI report including a CSI-RS resource indicator (CRI) that indicates M of the N sets of CSI-RS resources, and CSI for each of the M CSI-RS resources, and the transceiver is further configured to transmit, to the one or more selected TRPs, the determined CSI report including the CRI and the CSI for each of the M CSI-RS resources.

7. The UE of claim 6, wherein:
the CRI comprises N components, $CRI_1$ through $CRI_N$, M of which are greater than zero and remaining N−M are zero; and
CSI for an i-th set of CSI-RS resources is not included in the determined CSI report when $CRI_i$ is set to zero; and
CSI for an i-th set of CSI-RS resources is included in the determined CSI report when $CRI_i$ is greater than zero, and the CSI comprises at least one of channel quality indicator (CQI), a rank indicator (RI), a precoding matrix indicator (PMI), or a layer indicator (LI).

8. A transmission and reception point (TRP) in a wireless communication system, the TRP comprising:
a transceiver configured to:
transmit, to a user equipment (UE), channel status information (CSI) configuration information, wherein the TRP is at least one TRP of a group of (N) TRPs; and
receive, from the UE, a CSI report over an uplink channel,
wherein the CSI report is determined based on the CSI configuration information,
wherein the determined CSI report includes a TRP indicator for selecting (M) TRPs of the group of (N) TRPs, and CSI for each of the selected (M) TRPs,
wherein N is greater than one, and
wherein M is greater or equal to 1, and less or equal to N.

9. The TRP of claim 8, wherein the determined CSI report further includes a number (M) of selected TRPs for CSI reporting.

10. The TRP of claim 8, wherein the CSI configuration information includes a number (M) of selected TRPs for CSI reporting.

11. The TRP of claim 8, wherein:
the determined CSI report is partitioned into CSI1 comprising CSI for N1 TRPs and CSI2 comprising CSI for N2 TRPs;
the determined CSI report is transmitted via an uplink control information (UCI) comprising two parts, UCI1 and UCI2;
N1 is a fixed number greater or equal to one regardless of a value of M;
N2 is greater or equal to zero, and equal to M−N1;
the UCI1 includes the CSI1 and a UCI indicator for indicating a number of information bits for the UCI2, and a payload of UCI1 transmission in terms of number of information bits is fixed; and
the UCI2 includes the CSI2 and a payload of UCI2 transmission in terms of number of information bits is variable.

12. The TRP of claim 11, wherein:
the UCI indicator for indicating the number of information bits of the UCI2 comprises a bitmap, $b_1$ through $b_N$, of length N;
the bitmap comprises M ones and N-M zeros;
CSI for an i-th TRP is not included in the determined CSI report when a $b_i$ is set to zero; and
CSI for an i-th TRP is included in the determined CSI report when a $b_i$ is set to one.

13. The TRP of claim 8, wherein the transceiver is further configured to receive, from the UE, the determined CSI report including a CSI-RS resource indicator (CRI) that indicates M of the N sets of CSI-RS resources and CSI for each of the M CSI-RS resources, and
wherein the N sets of CSI-RS resources is measured, by the UE, one set for each of the group of (N) TRPs.

14. The TRP of claim 13, wherein:
the CRI comprises N components, $CRI_1$ through $CRI_N$, M of which are greater than zero and remaining N−M are zero; and
CSI for an i-th set of CSI-RS resources is not included in the determined CSI report when CRL is set to zero; and
CSI for an i-th set of CSI-RS resources is included in the determined CSI report when $CRI_i$ is greater than zero, and the CSI comprises at least one of channel quality indicator (CQI), a rank indicator (RI), a precoding matrix indicator (PMI), or a layer indicator (LI).

15. A method of a user equipment (UE) in a wireless communication system, the method comprising:
receiving, from at least one transmission and reception point (TRP) of a group of (N) TRPs, channel status information (CSI) configuration information;
determining a CSI report based on the CSI configuration information;
identifying, based on the CSI configuration information, one or more TRPs of the group of (N) TRPs to transmit the determined CSI report; and
transmitting, to the identified one or more TRPs, the determined CSI report over an uplink channel,
wherein the determined CSI report includes a TRP indicator for selecting (M) TRPs of the group of (N) TRPs and CSI for each of the selected (M) TRPs,
wherein N is greater than one, and
wherein M is greater or equal to 1, and less or equal to N.

16. The method of claim 15, wherein:
the determined CSI report further includes a number (M) of selected TRPs for CSI reporting; or
the CSI configuration information includes a number (M) of selected TRPs for CSI reporting.

17. The method of claim 15, wherein:
the determined CSI report is partitioned into CSI1 comprising CSI for N1 TRPs and CSI2 comprising CSI for N2 TRPs;
the determined CSI report is transmitted via an uplink control information (UCI) comprising two parts, UCI1 and UCI2;

N1 is a fixed number greater or equal to one regardless of a value of M;
N2 is greater or equal to zero, and equal to M−N1;
the UCI1 includes the CSI1 and a UCI indicator for indicating a number of information bits for the UCI2 and a payload of UCI1 transmission in terms of number of information bits is fixed; and
the UCI2 includes the CSI2 and a payload of UCI2 transmission in terms of number of information bits is variable.

18. The method of claim 17, wherein:
the UCI indicator for indicating the number of information bits of the UCI2 comprises a bitmap, $b_1$ through $b_N$, of length N;
the bitmap comprises M ones and N-M zeros;
CSI for an i-th TRP is not included in the determined CSI report when a $b_i$ is set to zero; and
CSI for an i-th TRP is included in the determined CSI report when a $b_i$ is set to one.

19. The method of claim 15, further comprising:
measuring N sets of CSI-reference signal (CSI-RS) resources, one set for each of the group of (N) TRPs; and
determining, based on the CSI configuration information, the CSI report including a CSI-RS resource indicator (CRI) that indicates M of the N sets of CSI-RS resources, and CSI for each of the M CSI-RS resources; and
transmitting, to the one or more selected TRPs, the determined CSI report including the CRI and the CSI for each of the M CSI-RS resources.

20. The method of claim 19, wherein:
the CRI comprises N components, $CRI_1$ through $CRI_N$, M of which are greater than zero and remaining N−M are zero; and
CSI for an i-th set of CSI-RS resources is not included in the determined CSI report when $CRI_i$ is set to zero; and
CSI for an i-th set of CSI-RS resources is included in the determined CSI report when $CRI_i$ is greater than zero, and the CSI comprises at least one of channel quality indicator (CQI), a rank indicator (RI), a precoding matrix indicator (PMI), or a layer indicator (LI).

* * * * *